(12) United States Patent
Shiimori

(10) Patent No.: US 6,853,461 B1
(45) Date of Patent: Feb. 8, 2005

(54) SYSTEM AND METHOD FOR ORDERING PRINTING OF IMAGES, AND SYSTEM AND METHOD FOR PRINTING EDITED IMAGES

(75) Inventor: Yoshiko Shiimori, Asaka (JP)

(73) Assignee: Fuji Photo Film Co., Ltd., Minami-Ashigara (JP)

(*) Notice: Subject to any disclaimer, the term of this patent is extended or adjusted under 35 U.S.C. 154(b) by 0 days.

(21) Appl. No.: 09/288,087

(22) Filed: Apr. 8, 1999

(30) Foreign Application Priority Data

Apr. 10, 1998 (JP) ............................................. 10-116249
Apr. 22, 1998 (JP) ............................................. 10-126649

(51) Int. Cl.[7] .......................... G06F 15/00; G06F 13/00
(52) U.S. Cl. ......................................... 358/1.15; 705/26
(58) Field of Search ............................ 358/1.15; 705/26

(56) References Cited

U.S. PATENT DOCUMENTS

| | | | | |
|---|---|---|---|---|
| 4,839,829 A | * | 6/1989 | Freedman | 345/751 |
| 5,666,215 A | * | 9/1997 | Fredlund et al. | 358/487 |
| 5,897,260 A | * | 4/1999 | Zingher | 400/719 |
| 5,974,401 A | * | 10/1999 | Enomoto et al. | 705/40 |
| 5,983,201 A | * | 11/1999 | Fay | 705/27 |
| 5,991,739 A | * | 11/1999 | Cupps et al. | 705/26 |
| 6,012,890 A | * | 1/2000 | Celorio Garrido | 412/19 |
| 6,037,928 A | * | 3/2000 | Nachinson et al. | 345/156 |
| 6,076,080 A | * | 6/2000 | Morscheck et al. | 705/400 |
| 6,198,526 B1 | * | 3/2001 | Ohtsuka | 355/40 |
| 6,324,521 B1 | * | 11/2001 | Shiota et al. | 705/27 |
| 6,336,100 B1 | * | 1/2002 | Yamada | 705/26 |

* cited by examiner

Primary Examiner—Edward Coles
Assistant Examiner—Alan Rahimi
(74) Attorney, Agent, or Firm—McGinn & Gibb, PLLC

(57) ABSTRACT

The user of a client computer is notified of services made available by a desired store. A store server is installed in a store. The user of the client computer sends an order-taking server an indication of a service the user wishes to have performed, and the order-taking server retrieves the names of stores providing this desired service. Information relating to stores found is transmitted from the order-taking server to the client computer. The store-related information is displayed on the client computer and a desired store (e.g., one located near the user's residence) is selected by the user. A service relating to image printing selected by the user is performed at the selected store. When the printing of the image is completed at the selected store, the user goes to the store to pick up the printed matter.

56 Claims, 44 Drawing Sheets

*Fig. 4*

STORE BASIC-INFORMATION TABLE

| STORE NO. | STORE NAME | POSTAL ZIP CODE | LOCATION (PREFECTURE) | LOCATION (CITY) | LOCATION (TOWN) | LOCATION (ALL) | TEL NO. | FAX NO. |
|---|---|---|---|---|---|---|---|---|
| 1 | ×× STORE | 351-0022 | SAITAMA PREFECTURE | ASAKA CITY | | x-x HIGASHI-BENZAI, ASAKA CITY, SAITAMA PREF. | 048-468-xxxx | 048-468-xxx1 |
| 2 | ○○ STORE | 251-2345 | KANAGAWA PREFECTURE | KAWASAKI CITY | MIYAMAE-KU | ○-○ NOGAWA, MIYAMAE-KU, KAWASAKI CITY, KANAGAWA PREF. | 044-751-○○○○ | 044-751-○○○2 |
| 3 | △△ STORE | 106-0000 | TOKYO PREFECTURE | MINATO-KU | | △-△-△ NISHI-AZABU, MINATO-KU, TOKYO | 03-3406-△△△△ | 03-3406-△△△3 |
| 4 | ◇◇ STORE | 250-0111 | KANAGAWA PREFECTURE | ASHIGARA KAMIGUN | KAISEI-CHO | ◇-◇ MIYA, KAISEI-CHO, ASHIGARA KAMIGUN, KANAGAWA PREF. | 0465-27-◇◇◇◇ | 0465-27-◇◇◇4 |

*Fig. 5*

AVAILABLE-SERVICE TABLE

| SERVICE NO. | STORE NO. | SERVICE NAME | BASIC FEE | DELIVERY |
|---|---|---|---|---|
| 1 | 1 | PRINT UPLOAD | 500 | 2 |
| 2 | 1 | POSTCARD | 1,500 | 5 |
| 3 | 1 | CALENDER | 500 | 3 |
| 4 | 2 | POSTCARD | 1,200 | 7 |
| 5 | 3 | PRINT UPLOAD | 400 | 2 |
| 6 | 4 | PRINT UPLOAD | 600 | 3 |
| 7 | 4 | CALENDER | 300 | 3 |

*Fig. 6*

UNIT-PRICE TABLE

| SERVICE NO. | LOWER LIMIT ON NUMBER OF PRINTS | UPPER LIMIT ON NUMBER OF PRINTS | UNIT PRICE |
|---|---|---|---|
| 1 | 1 | NONE | 50 |
| 2 | 10 | 30 | 90 |
| 2 | 31 | 50 | 80 |
| 2 | 51 | 70 | 70 |
| 2 | 71 | NONE | 60 |
| 3 | 1 | NONE | 60 |
| 4 | 10 | 50 | 90 |
| 4 | 51 | 70 | 75 |
| 4 | 71 | NONE | 60 |
| 5 | 1 | NONE | 45 |
| 6 | 1 | NONE | 40 |
| 7 | 1 | NONE | 65 |

Fig. 7

SPECIAL-SERVICE TABLE

| SERVICE NO. | SPECIAL BASIC FEE | START DATE | END DATE |
|---|---|---|---|
| 1 | 0 | 98.3.1 | 98.3.31 |
| 2 | 500 | 98.4.1 | 98.4.30 |
| 3 | 0 | 98.5.1 | 98.5.31 |
| 7 | 300 | 98.4.1 | 98.7.31 |

Fig. 8

SPECIAL UNIT-PRICE TABLE

| SERVICE NO. | LOWER LIMIT ON NUMBER OF PRINT | UPPER LIMIT ON NUMBER OF PRINT | UNIT PRICE |
|---|---|---|---|
| 1 | 1 | NONE | 50 |
| 2 | 10 | 30 | 90 |
| 2 | 31 | 50 | 80 |
| 2 | 51 | 70 | 70 |
| 2 | 71 | NONE | 60 |

*Fig. 9*

ADVERTISEMENT-TEXT TABLE

| STORE NO. | URL OF ADVERTISEMENT-TEXT FILE |
|---|---|
| 1 | c:¥xx¥ADVERTIESEMENT¥TEXT¥aaa.txt |
| 2 | c:¥○○¥ADVERTIESEMENT¥TEXT¥bbb.txt |
| 3 | c:¥△△¥ADVERTIESEMENT¥TEXT¥ccc.txt |
| 4 | c:¥◇◇¥ADVERTIESEMENT¥TEXT¥ddd.txt |

*Fig. 10*

ADVERTISEMENT-CONTENT TABLE

| STORE NO. | URL OF ADVERTISEMENT-CONTENT FILE |
|---|---|
| 1 | c:¥xx¥ADVERTIESEMENT¥CONTENT¥hhh.gif |
| 2 | c:¥○○¥ADVERTIESEMENT¥CONTENT¥iii.gif |
| 3 | c:¥△△¥ADVERTIESEMENT¥CONTENT¥jjj.gif |
| 4 | c:¥◇◇¥ADVERTIESEMENT¥CONTENT¥kkk.gif |

*Fig. 21*

| ORDER POSTCARD | |
|---|---|
| PLEASE NOTE:<br>ENTER THE MAIL ADDRESS YOU USE MOST OFTEN AS YOUR E-MAIL ADDRESS.<br>THE E-MAIL ADDRESS YOU ENTER WILL SUBSEQUENTLY BE USED TO CONTACT YOU.<br>MAKE SURE YOUR E-MAIL ADDRESS IS CORRECT. A70 | |
| NUMBER OF POSTCARDS | NEW YEAR'S LOTTERY POSTAL CARD |
| NUMBER ORDERED (TEN OR MORE) | 50 |
| STORE USED | ***PHOTO-DEVELOPING SHOP;5TH FLOOR; PRO CORNER |
| NAME | TARO FUJI |
| AGE | 30 |
| GENDER | MALE |
| CATEGORY OF BUSINESS | AGRICULTURE AND FISHERIES |
| OCCUPATION | SALES |
| E-MAIL ADDRESS | tarou@fujifilm.co.jp |
| TEL. NO. | 03-3406-0000 |
| FAX. NO. | |
| POSTAL ZIP CODE | 106 |
| ADDRESS (STARTING FROM PREFECTURE) | NISHI-AZABU, MINATO-KU, TOKYO |
| PASSWORD (FIVE CHARACTERS) | DO NOT INCLUDE SPACES |

THE FEE IS [ 5400 ] YEN   [ RE-CALCULATE ]
            A71                         A72

PRESS "ORDER!" BUTTON IF ENTRY IS FINISHED

[ ORDER ]   [ ERASE ]   [ CANCEL ]
 A73         A74         A75

*Fig. 37*

ORDER INFORMATION FILE

| | |
|---|---|
| OrderCnt=5 | # NUMBER OF ORDERS |
| [Personal] | # PERSONAL INFORMATION |
| Name="TARO FUJI" | # NAME |
| TelNo="048-468-0000" | # TELEPHONE NO. |
| FaxNo="048-468-xxxx" | # FAX NO. |
| "ZipNo="351" | # POSTAL ZIP CODE |
| Address="0-0-0 SENSUI, ASAKA-SHI, SAITAMA PREF." | # ADDRESS |
| MailAddress="taro@fujifilm.co.jp" | # E-MAIL ADDRESS |
| [Order 1] | # FIRST ITEM OF ORDER INFORMATION |
| PrintNum=20 | # NUMBER OF PRINTS |
| PrintSize="A4" | # PRINT SIZE |
| [Order 2] | # SECOND ITEM OF ORDER INFORMATION |

EDITING INFORMATION FILE

| | |
|---|---|
| OrderCnt=5 | # NUMBER OF ORDERS |
| [Image 1] | # FIRST ITEM OF ORDER INFORMATION |
| ImageCnt=2 | # NUMBER OF IMAGE FILES INSERTED |
| FileName= Imagfe1.jpg[Image 2.jpg] | # IMAGE FILE NAME |
| Region=0.0,0.0,0.4,0.3[,0.6,0.8,0.1] | # IMAGE DISPLAY POSITIONS: SX,SY, EX, EY (X,Y COORDINATES OF UPPER LEFT EDGE; X,Y COORDINATES OF LOWER RIGHT EDGE) |
| Aspect=0.6[0.3] | # ASPECT OF IMAGE FILE |
| [Template 1] | # FIRST ITEM OF TEMPLATE INFORMATION |
| Template="http://ImageServer/Template/Temp1.jpg" | # PATH OF TEMPLATE IMAGE |
| [ClipArt1] | # FIRST ITEM OF CLIP-ART INFORMATION |
| ClipArtCnt=1 | # NUMBER OF ITEMS OF CLIP ART INSERTED IN IMAGE |
| ClipArtFile="http://ClipArtServer/Image1.jpg" | # PATH OF CLIP ART |
| Region=0.3,0.3,0.2,0.2 | # CLIP-ART DISPLAY POSITIONS: SX, SY,EX,EY (X, Y COORDINATES OF UPPER LEFT EDGE; X,Y COORDINATES OF LOWER RIGHT EDGE) |
| Aspect=0.6 | # ASPECT OF CLIP ART |
| [Text1] | # FIRST ITEM OF TEXT INSERTED IN IMAGE |
| TextCnt=1 | # PATH OF TEXT |
| TextFile"http://Server/Usr/Text1.txt" | # TEXT DISPLAY POSITIONS: SX,SY,EX,EY (X, Y COORDINATES OF UPPRER LEFT EDGE; X, Y COORDINATES OF LOWER RIGHT EDGE) |
| Region=0.1,0.8,0.2,0.2 | # ASPECT OF CLIP ART |
| Aspect=0.6 | # SECOND ITEM OF TEXT INFORMATION |
| [Image2] | |
| ⋮ | |
| [Template] | # SECOND ITEM OF TEMPLATE INFORMATION |
| ⋮ | |
| [ClipArt2] | # SECOND ITEM OF CIP-ART INFORMATION |
| ⋮ | |
| [Text] | # SECOND ITEM OF TEXT INFORMATION |
| ⋮ | |

Fig. 40

ORDER-NUMBER FILE

NUMBER OF ORDERS BEING PROCESSED
[INFORMATION FOR EACH ORDER]
    ORDER NUMBER
    ORDER STATUS [PROCESSING IN PROGRESS PROCESSING
                                     FINISHED   PROCESSING HALTED]
    ORDER ACCEPTANCE TIME
    ORDER-INITIATION ACCEPTANCE TIME
    ORDER-END ACCEPTANCE TIME
    USER MAILING ADDRESS

Fig. 41

ORDER MANAGEMENT FILE

NUMBER OF ITEMS OF ORDER DATA
    ORDER-DATA ACCEPTANCE DATE
[INFORMATION FOR EACH ORDER]
    ORDER-DATA NUMBER
    ORDER-DATA ACCEPTANCE TIME

Fig. 42

ORDER INFORMATION FILE

ORDER NUMBER
    NUMBER OF ORDERS
    PRINT SIZE

*Fig. 43*

EDIT INFORMATION FILE

[Image]
FileName=Image1.jpg                             # IMAGE FILE NAME
Region=0.0,0.0,1.0,1.0                          # IMAGE FILE DISPLAY POSITIONS SX,SY,EX,EY
                                                  (X,Y COORDINATES OF UPPER LEFT EDGE;
                                                  X,Y COORDINATES OF LOWER RIGHT EDGE)
Aspect=0.6                                      # ASPSCT OF IMAGE FILE

[Template]
Template="http://ImageServer/Template/Temp1.jpg" # PATH OF TEMPLATE IMAGE
Masking="http://MaskServer/Mask1.jpg"           # PATH OF MASK IMAGE

[ClipArt]
ClipArtcnt=1                                    # NUMBER OF ITEMS OF CRIP ART INSERTED IN IMAGE
ClipArtFile=http://ClipArtServer/Image1.jpg     # PATH OF CLIP ART
Region=0.0,0.0,1.0,1.0                          # CLIP ART DISPLAY POSITIONS SX,SY,EX,EY
                                                  (X,Y COORDINATES OF UPPER LEFT EDGE;
                                                  X,Y COORDINATES OF LOWER RIGHT EDGE)
Aspect=0.6                                      # ASPECT OF CLIP ART

[Text]

TextCnt=1                                       # NUMBER OF ITEMS OF TEXT INSERTED IN IMAGE
TextFile="http://Server/Usr/Text1.txt."         # PATH OF TEXT
Region=0.0,0.0,1.0,1.0                          # TEXT DISPLAY POSITIONS SX,SY,EX,EY
                                                  (X,Y COORDINATES OF UPPER LEFT EDGE;
                                                  X,Y COORDINATES OF LOWER RIGHT EDGE)
Aspect=0.6                                      # ASPECT OF TEXT

SYSTEM AND METHOD FOR ORDERING PRINTING OF IMAGES, AND SYSTEM AND METHOD FOR PRINTING EDITED IMAGES

BACKGROUND OF THE INVENTION

1. Field of the Invention

This invention relates to a system for ordering the printing of images, in which a store (shop) server is installed in each of a plurality of stores, client computers are capable of communicating data with an order-taking server, and the order-taking server is capable of communicating data with the store servers; a method of ordering the printing of images in this system; a client computer and order-taking server constructing the system and a method of controlling the operation of the client computer and order-taking server; and a recording medium on which a program for controlling the operation of the client computer has been stored.

This invention further relates to an edited-image printing system, as well as the associated method, comprising a client computer and an image server that are capable of communicating data with each other; a client computer and an image server constructing the edited-image printing system as well as a method of controlling the operation of the client computer and a method of controlling the operation of the image server; and a recording medium on which a program for controlling the operation of the client computer has been stored.

2. Description of the Related Art

In a system on its way to becoming implemented, order information regarding the printing of images is transmitted from a client computer to an order-taking server, and the order-taking server that has received the order information prints images in accordance with the order information. With a system of this kind, the images are printed by a high-resolution printer connected to the order-taking server and the printed matter is mailed to the user of the client computer.

There are also instances where a store server capable of communicating with the order-taking server is installed in a store, image data representing images to be printed is transmitted from the order-taking server to the store server and the images are printed by a high-resolution printer connected to the store server. In this case the user of the client computer goes to the store to pick up the printed matter.

In the case where the user of the client computer is to go to a store to pick up printed matter, it would be convenient for the user if the user could acquire information relating to the store when the order is placed.

In another system on its way to becoming implemented, an edited image is generated by combining an image with a template image in a client computer, editing information such as image placement position for generating the edited image and desired-image data representing a desired image to be combined with the template image are transmitted from the client computer to the image server, and the image server prints the edited image. The edited image that has been printed is mailed to the user of the client computer.

In a situation where edited images of a plurality of frames are printed by the image server, it is laborious to transmit the editing information and the desired-image data from the client computer to the image server for each and every frame of the edited images. Further, in a case where the editing information and desired-image data are transmitted for each frame of the edited images, management and control must be carried out in regard to which client computer made the transmission.

SUMMARY OF THE INVENTION

Accordingly, an object of the present invention is to make it possible to acquire information relating to a store beforehand in a case where a client computer orders printing of an image from an order-taking server.

Another object of the present invention is to reduce the labor demanded of a client computer user in a case where edited images of a plurality of frames are printed at an image server.

A further object of the present invention is to enable management to be performed with comparatively high accuracy in a situation where editing information and desired-image data have been transmitted from a plurality of client computers.

A first aspect of the present invention relates to a system in which a store server is installed in each of a plurality of stores, a client computer and an order-taking server are capable of communicating data with each other, and the order-taking server and the store servers are capable of communicating data with each other.

The order-taking server has store-name-list-data transmitting means (a store-name-list-data transmitting device), which is responsive to a store-name list request from the client computer, for transmitting data representing a list of store names to the client computer.

The client computer includes: first display control means (a first display control device) for controlling a display unit so as to display the list of store names represented by the store-name-list data transmitted from the store-name-list-data transmitting means; designating means (a designating device) for designating a desired store in the store-name list displayed on the display unit based upon display control by the first display control means; designated-store-name transmitting means (a designated-store-name transmitting device) for transmitting, to the order-taking server, data representing the store name designated by the designating means; and order information transmitting means (an order information transmitting device) for transmitting order information, which relates to printing of an image, to the order-taking server.

The order-taking server further includes order-related information transmitting means (an order-related information transmitting device) for transmitting information, which is related to the order information transmitted by the order information transmitting means, to the store server installed in the store designated by the data representing the designated store name transmitted from the designated-store-name transmitting means.

The store server has order-related-information receiving means (an order-related information receiving device) for receiving the order-related information transmitted from the order-related information transmitting means.

The first aspect of the present invention provides also a method suited for the system described above. Specifically, there is provided a method applicable to a system in which a store server is installed in each of a plurality of stores, a client computer and an order-taking server are capable of communicating data with each other, and the order-taking server and the store servers are capable of communicating data with each other.

The method comprises the steps of: transmitting data representing a store-name list from the order-taking server to the client computer in response to a request for the store-name list from the client computer; displaying, on a display unit of the client computer, the store-name list represented by the store-name-list data transmitted from the order-taking server; designating a desired store in the store-name list displayed on the display unit; transmitting, from the client computer to the order-taking server, data representing the designated store name and order information relating to printing of an image; transmitting information, which is related to the order information transmitted by the order information transmitting means, from the order-taking server to the store server installed in the store designated by the data representing the designated store name transmitted from the client computer; and receiving the order-related information, which is transmitted from the order-taking server, at the store server.

In accordance with the first aspect of the present invention, the store-name-list data is transmitted from the order-taking server to the client computer in response to a request for the store-name list from the client computer. When this data representing the list of store names is received by the client computer, the list of store names is displayed on the display unit connected to the client computer.

The user of the client computer selects a desired store from among the store names displayed in the form of a list. Data representing the selected store name is transmitted from the client computer to the order-taking server. In addition, order information (the number of prints ordered, the name and address of the orderer, etc.) relating to the printing of an image is transmitted from the client computer to the order-taking server.

When data representing the selected store name and the order information are received by the order-taking server, the latter transmits the order-related information (which may be the order information per se or may include image data for printing) to the store server installed in the store that has been selected.

The store server that has received the order-related information prints an image on the basis of the order-related information.

In accordance with the first aspect of the present invention, the user of the client computer is capable of viewing the list of store names beforehand when an order is placed. Viewing the list of store names makes it possible for the user to select a convenient store.

The client computer or order-taking server constructing the above-mentioned system may be arranged on a stand-alone basis. Furthermore, a program for controlling the operation of the client computer can be stored on a recording medium.

Preferably, area-specifying data for specifying an area is transmitted from the client computer to the order-taking server, and a list of stores names located in the area represented by the area-specifying data transmitted from the client computer is transmitted from the order-taking server to the client computer.

The user of the client computer transmits the area-specifying data specifying the area (e.g., one located near the residence of the user) convenient for the user to the order-taking server, in response to which the order-taking server transmits the data representing the list of store names in the specified area to the client computer. Thus, only the names of stores located in the required area can be obtained.

An arrangement can be adopted in which image-processing-service data representing services relating to image processing performed by a designated store can be transmitted from the order-taking server to the client computer, and the image processing services represented by this image-processing-service data can be displayed on the display unit of the client computer. In this case a desired image processing service is selected from the image processing services displayed on the display unit, and the selected image-processing-service data representing the selected image processing service is transmitted from the client computer to the order-taking server. The latter executes the selected image processing, which is represented by the selected-image-processing data that has been transmitted, in regard to the image data representing the image to be printed, and transmits the processed image data to the store server.

Image-processing-service data representing services (e.g., a service relating to image processing such as combining an image with a template for creating a postcard and a service for uploading image data and printing an image represented by the uploaded image data) relating to image processing performed by a designated store is transmitted from the order-taking server to the client computer. When the image-processing-service data is transmitted to the client computer, the content of the image processing services represented by the image-processing-service data is displayed on the display unit of the client computer.

The user of the client computer views the image processing services displayed on the display unit and selects the image processing service desired to be utilized. The data representing the selected image processing service is transmitted from the client computer to the order-taking server.

The order-taking server applies the selected image processing to image data representing an image to be printed. The image data that has been subjected to the selected image processing is transmitted from the order-taking server to the store server.

The user of the client computer is capable of ascertaining the image processing services performed by a store that has been designated by the user. A desired image processing service can be selected from the image-processing services performed by the designated store. In a case where the designated store is not providing the image processing service that the user desires to be utilized, the user is capable of newly selecting a store that is providing the image processing service desired to be utilized.

The order-taking server executes the image processing selected by the user and the processed image data is transmitted from the order-taking server to the store server. However, the image processing selected by the user may be performed by the store server. When the image processing is executed by the store server, the data representing the selected image processing and the image data before image processing would be transmitted from the order-taking server to the store server.

Preferably, the client computer selects desired image processing from a plurality of types of image processing and transmits selected-image-processing data, which represents the selected image processing, to the order-taking server. The latter transmits, to the client computer, data representing a list of names of stores that execute the image processing represented by the selected-image-processing data transmitted from the client computer. The latter selects the desired store from the list of names of stores that execute image processing, the store names being represented by the list data.

Before the user of the client computer selects a store, the image processing which the user desires to utilize is selected. The list of the names of stores that execute the selected processing is transmitted from the order-taking server to the client computer. The user selects the desired store from the list of store names.

Before a store is selected, the user can ascertain the stores that execute the image processing that the user desires to be utilized. Thus the selected store will always be one that executes the image processing that the user wishes to be utilized.

The order-taking server may further be provided with user-fee calculating means (a user-fee calculating device) for calculating a user fee incurred at a designated store in regard to a selected image processing service, and user-fee transmitting means (a user-fee transmitting device) for transmitting the user fee calculated by the user-fee calculating means to the client computer.

The user of the client computer can thus know the user fee. The user can ascertain the user fee of a selected store also in a case where the user fee differs from store to store. Also, in a case where a specific store establishes a special rate for a specific period of time, the user of the client computer can acquire knowledge of the special rate.

The order-taking server may further be provided with advertising-data transmitting means (an advertising-data transmitting device) which, in response to receipt of data representing a designated store, transmits data representing an advertisement regarding this designated store to the client computer.

Thus, the order-taking server is capable of transmitting data representing an advertisement regarding the store designated by the client computer. The advertisement regarding the designated store can be displayed on the display unit of the client computer.

An order-taking server may construct a system in which a client computer and the order-taking server are capable of communicating data with each other and may include store-name-list data transmitting means (a store-name-list data transmitting device), which is responsive to a store-name-list request, for transmitting data representing a list of store names to the client computer; receiving means (a receiving device) for receiving data representing a store name designated by the client computer and order information relating to printing of an image; and printing means (a printing device) for printing an image on the basis of the order information received by the receiving means.

In this case an image that has been printed by the order-taking server would be mailed to a store (and the store would be designated by the client computer).

An edited-image printing system according to a second aspect of the present invention comprises a client computer and an image server that are capable of communicating data with each other.

The client computer includes: desired-image deciding means (a desired-image deciding device) for deciding a desired image that is to be combined with a template image; position deciding means (a position deciding device) for deciding placement position of the desired image decided by the desired-image deciding means; editing means (an editing device) for obtaining edited images of a plurality of frames by repeatedly executing desired-image decision processing by the desired-image deciding means and position decision processing by the position deciding means; and transmitting means (a transmitting device) for linking desired-image data representing a desired image constituting the edited image obtained by the editing means and placement-position data representing the placement position of this desired image, and transmitting the desired-image data constituting edited images of a plurality of frames and the placement-position data to the image server.

The image server includes receiving means (a receiving device) for receiving the desired-image data and the placement-position data transmitted from the transmitting means of the client computer, and edited-image generating means (an edited-image generating device) for generating the edited images of the plurality of frames from the desired-image data and placement-position data received by the receiving means.

The second aspect of the present invention provides also a method suited for the system described above. Specifically, in an edited-image printing system comprising a client computer and an image server that are capable of communicating data with each other, the client computer decides a desired image, which is to be combined with a template image, and placement position of the desired image; obtains edited images of a plurality of frames by repeatedly executing desired-image decision processing and position decision processing; links desired-image data representing a desired image constituting the edited image obtained and placement-position data representing the placement position of this desired image, and transmits the desired-image data constituting edited images of a plurality of frames and the placement-position data to the image server. The image server receives the desired-image data and the placement-position data transmitted from the client computer. The edited images of the plurality of frames are generated by the image server from the received desired-image data and placement-position data.

In accordance with the second aspect of the present invention, edited images of a plurality of frames are generated by the client computer. The desired-image data representing a desired image constituting the edited image and placement-position data representing the placement position of this desired image is linked and transmitted from the client computer to the image server. A plurality of frames of the edited images inclusive of the desired-image data and placement-position data are transmitted from the client computer to the image server.

When all of the desired-image data and placement-position data constituting the edited images of the plurality of frames has been received by the image server, the edited images of the plurality of frames are generated and printed.

Edited images of a plurality of frames can be printed by just a single transmission from the client computer to the image server. Since it is unnecessary to perform transmission a plurality of times in order to print edited images of a plurality of frames, less labor is required of the user of the client computer.

The third aspect of the present invention provides an edited-image printing system comprising a plurality of client computers and an image server capable of communicating data with each other.

Each client computer includes: desired-image deciding means (a desired-image deciding device) for deciding a desired image that is to be combined with a template image; position deciding means (a position deciding device) for deciding placement position of the target image decided by the desired-image deciding means; editing means (an editing device) for obtaining an edited image from the desired image decided by the desired-image deciding means and the placement position decided by the position deciding means; and transmitting means (a transmitting device) for linking identification data specific to the client computer to desired-image data representing a desired image constituting the edited image and placement-position data representing the placement position of this desired image, and transmitting the resulting data to the image server.

The image server includes: receiving means (a receiving device) for receiving the desired-image data, the placement-position data and the identification data transmitted from the transmitting means of the client computer; storage means for storing the desired-image data and the placement-position data received by the receiving means, this data being stored classified by client computer identified by the identification data; and edited-image generating means (an edited-image generating device) for generating the edited image, on a per-client-computer basis, from the desired-image data and placement-position data classified by client computer in the storage means.

The third aspect of the present invention provides also a method suited for the system described above. Specifically, in an edited-image printing system comprising a plurality of client computers and an image server that are capable of communicating data with each other, each client computer decides a desired image, which is to be combined with a template image, and placement position of the desired image; obtains an edited image from the desired image and placement position that have been decided; and links identification data specific to the client computer to the desired-image data and placement-position data representing the placement position of this desired image, and transmits the resulting data to the image server. The image server receives the desired-image data, the placement-position data and the identification data transmitted from the client computer; stores the desired-image data and the placement-position data that have been received, this data being classified by client computer identified by the identification data; and generates the edited image, on a per-client-computer basis, from the desired-image data and placement-position data classified by client computer.

In accordance with the third aspect of the present invention, when the desired image and the placement position are each decided and an edited image is obtained, identification data specific to the client computer is linked to the desired-image data representing a desired image constituting the edited image and the placement-position data representing the placement position of this desired image, and the resulting data is transmitted from the client computer to the image server.

When the image server receives the desired-image data and the placement-position data linked to the identification data, the desired-image data and the placement-position data is stored for each client computer identified by the identification data. An edited image is generated, on a per-client-computer basis, from the desired-image data and placement-position data classified by client computer, and the edited image is printed by the image server.

Thus, the image server manages the desired-image data and placement-position data on a per-client-computer basis.

The client computer and the image server constituting the edited-image printing system described above can each be arranged on a stand-alone basis. Furthermore, it is possible to create a recording medium on which a program for controlling the operation of the client computer is stored.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 illustrates a store basic-information table;

FIG. 5 illustrates a table of available services;

FIG. 6 illustrates a table of unit prices;

FIG. 7 illustrates a table of special services;

FIG. 8 illustrates a table of special unit prices;

FIG. 9 illustrates a table of advertisement text;

FIG. 10 illustrates a table of advertisement content;

FIGS. 16 to 21 show examples of display screens;

FIG. 37 illustrates an order information file;

FIG. 38 illustrates an editing information file;

FIG. 40 illustrates an order-number file;

FIG. 41 illustrates an order management file;

FIG. 42 illustrates an order information file;

FIG. 43 illustrates an edited information file; and

DESCRIPTION OF THE PREFERRED EMBODIMENTS (A) First Embodiment

Figure 1:
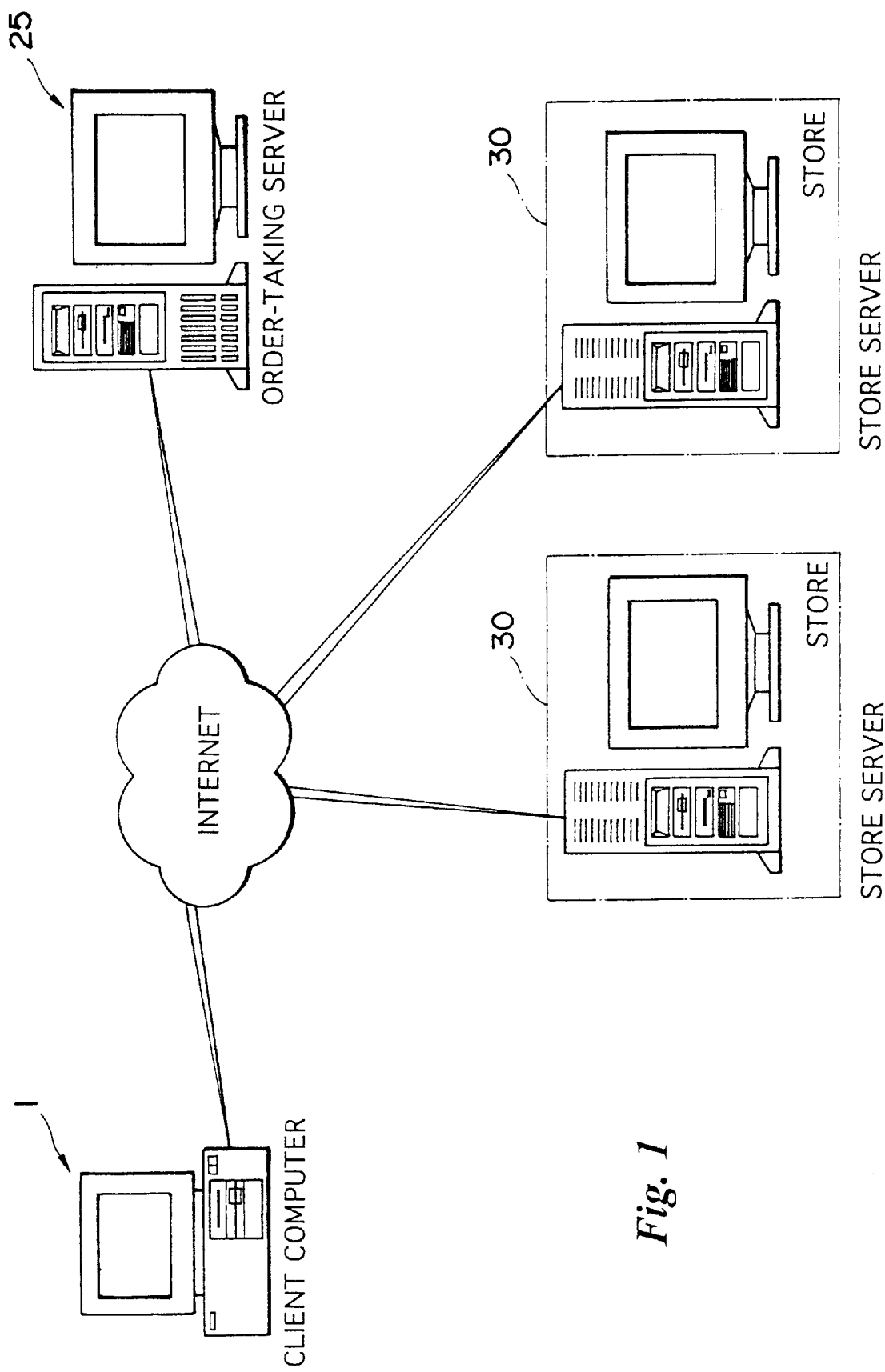
FIG. 1 illustrates the general configuration of a system for ordering the printing of images.

FIG. 1 illustrates the general configuration of a system for ordering the printing of images according to a first embodiment of the present invention.

The system for ordering the printing of images comprises a client computer 1 usually installed at the residence of the user, an order-taking server 25 for taking orders for the printing of images from the client computer 1, and store servers 30 installed in a plurality of stores (photo labs). The client computer 1 and order-taking server 25 are capable of communicating data with each other via a Internet. It is possible for the order-taking server 25 and store (shop) server 30 to communicate data with each other via the Internet.

Order information regarding the printing of an image is transmitted from the client computer 1 to the order-taking server 25. When the order-taking server 25 receives the order information, the order information is transmitted to the store server 30, at which the image is printed by a high-resolution printer that has been connected to the store server 30. When the image is printed, the store server 30 communicates this fact to the user of the client computer 1. Upon being so notified by the operator of the store server 30, the user of the client computer 1 goes to the store to pick up the print of the image.

The details of the image printing system will become more apparent from the description that follows.

Figure 2:
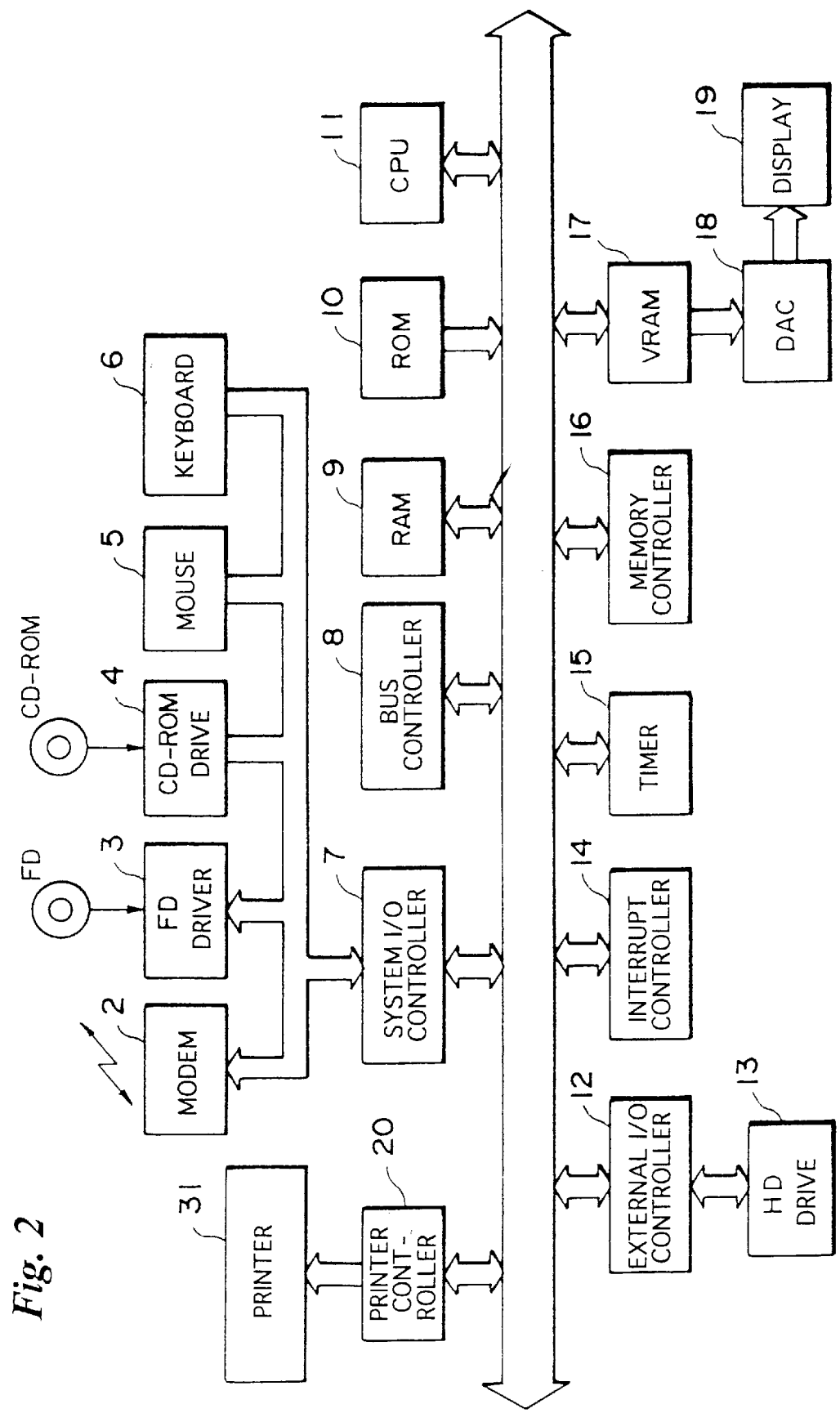
FIG. 2 is a block diagram showing the electrical construction of a client computer.
Figure 3:
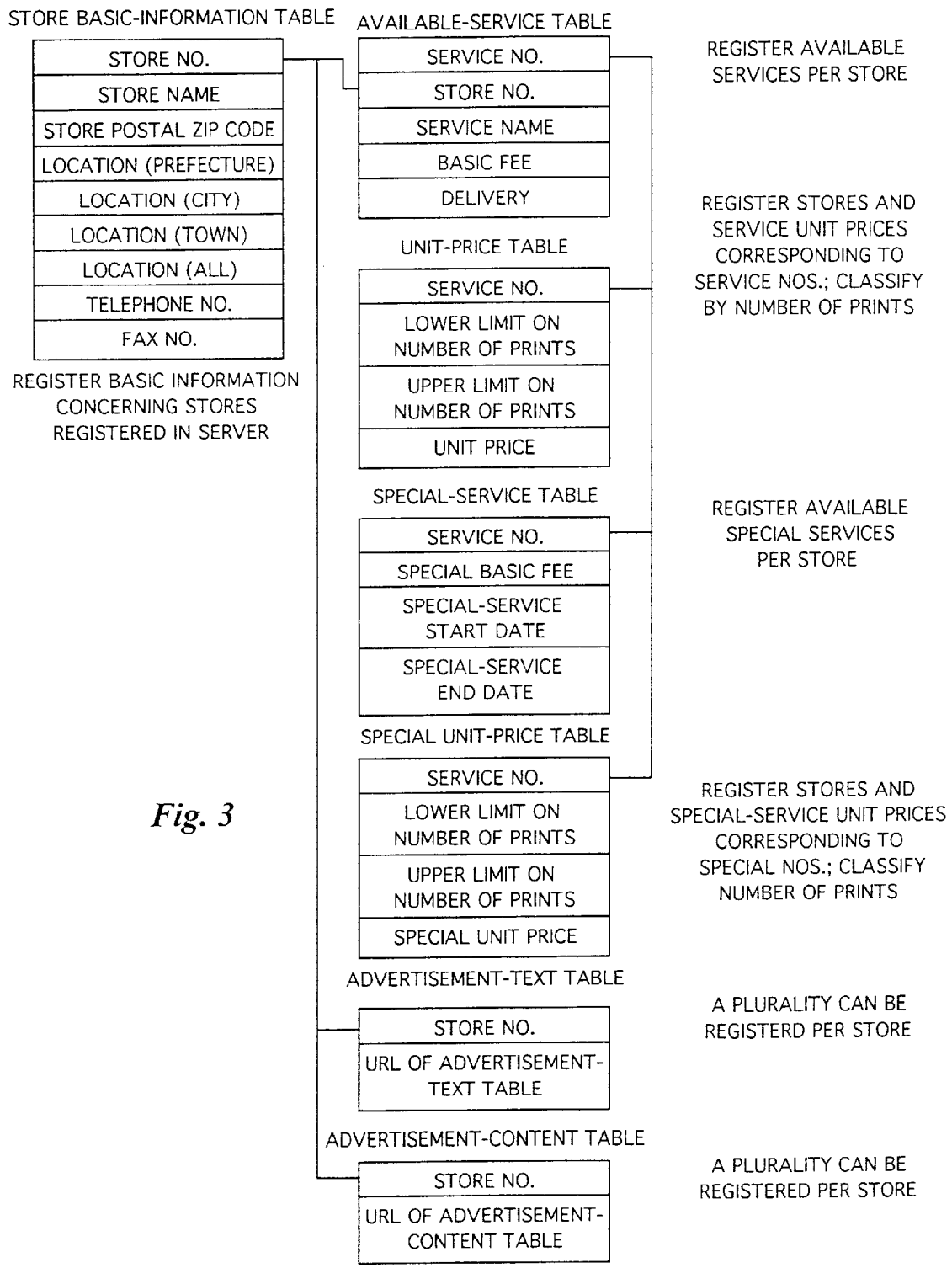
FIG. 3 illustrates tables stored in an order-taking server.

FIG. 2 is a block diagram showing the electrical construction of the client computer 1.

The overall operation of the client computer 1 is supervised by a CPU 11.

Connected to the client computer 1 are a modem 2 for performing data communication with the order-taking server 25; a floppy disk (FD) drive 3 for recording data on a floppy disk and reading data that has been recorded on the floppy disk; a CD-ROM drive 4 for reading data that has been recorded on a CD-ROM (compact disc read only memory); a mouse 5; and a keyboard 6. The data obtained from the modem 2, etc., is loaded into the client computer 1 via a system I/O controller 7.

A program for ordering the printing of images has been stored on the CD-ROM. The stored program is read by the CD-ROM drive 4 so that the program is installed in the client computer 1.

The client computer 1 includes a bus controller 8; a RAM 9 for storing data temporarily; and a ROM 10 for storing programs and other necessary data. A hard-disk drive 13 is connected to the client computer 1 via an external I/O controller 12. Data can be written to and read in from a hard disk (not shown) by the hard-disk drive 13.

The client computer 1 further includes an interrupt controller 14, a microphone 15, a memory controller 16, and a VRAM 17 for storing image data temporarily in order to display images on the a display unit 19. The image data stored in the VRAM 17 is fed to a digital analog converter 18, so that the image data is converted into an analog video signal. The analog video signal is fed to the display unit 19, so that an image is displayed on a screen of the display unit 19.

A printer 21 connected to the client computer 1 is controlled by a printer control circuit 20.

The order-taking server 25 and store server 30 have substantially the same construction as that of the client computer 1 shown in FIG. 2. However, one difference is that whereas the printer 21 connected to the client computer 1 often has a comparatively low resolution, the printers connected to the order-taking server 25 and store server 30 have a high resolution. Further, various tables of the kind described next are stored on the hard disk (not shown) in the order-taking server 25.

FIGS. 3 to 10 illustrate various tables stored in the order-taking server 25. These tables include a table of basic information about stores, a table of available services, a unit-price table, a special-price table, a special unit-price table, an advertisement-text table and an advertisement-content table.

The table of basic information about stores is one which stores basic information regarding stores in which store servers 30 capable of performing data communication with the order-taking server 25 have been installed. Stored in this table on a per-store basis are a store-specific store number, store name, postal zip code of the store, store location classified by prefecture, store location classified by city, store location classified by town, store location (in entirety, from prefecture to house number), store telephone number and store facsimile number.

The table of available services stores information regarding services that stores provide. Stored in this table are a service number, the above-mentioned store number, the name of the service, the basic fee for the service and the time period for delivery in a case where the service is performed.

The unit-price table stores information regarding a unit price that corresponds to the service (number). A service number, lower limit on number of prints, upper limit on number of prints and unit price are stored in this table on a per-service-number basis.

The table of special services is for storing information regarding special services provided by a store. A service number, special basic fee, and the starting and end dates of the special basic fee are stored in this table on a per-service-number basis.

The table of special unit prices is for storing information on special prices with regard to prices set by a store. A service number, lower limit on number of prints, upper limit on number of prints and special unit price are stored in this table on a per-service-number basis.

The table of advertisement text stores, on a per-store-number basis, an URL (Uniform Resource Locator) designating a file made of advertisement text regarding a store.

The table of advertisement content stores, on a per-store-number basis, an URL designating a file made up of advertisement content (images constituting an advertisement) regarding a store.

Among these tables, the table of basic information about stores, the table of available services, the advertisement-text table and the advertisement-content table are linked to one another by store numbers. Further, the table of available services, the unit-price table, the special-service table and the special-price table are linked to one another by service numbers (see FIG. 3).

Figure 15:
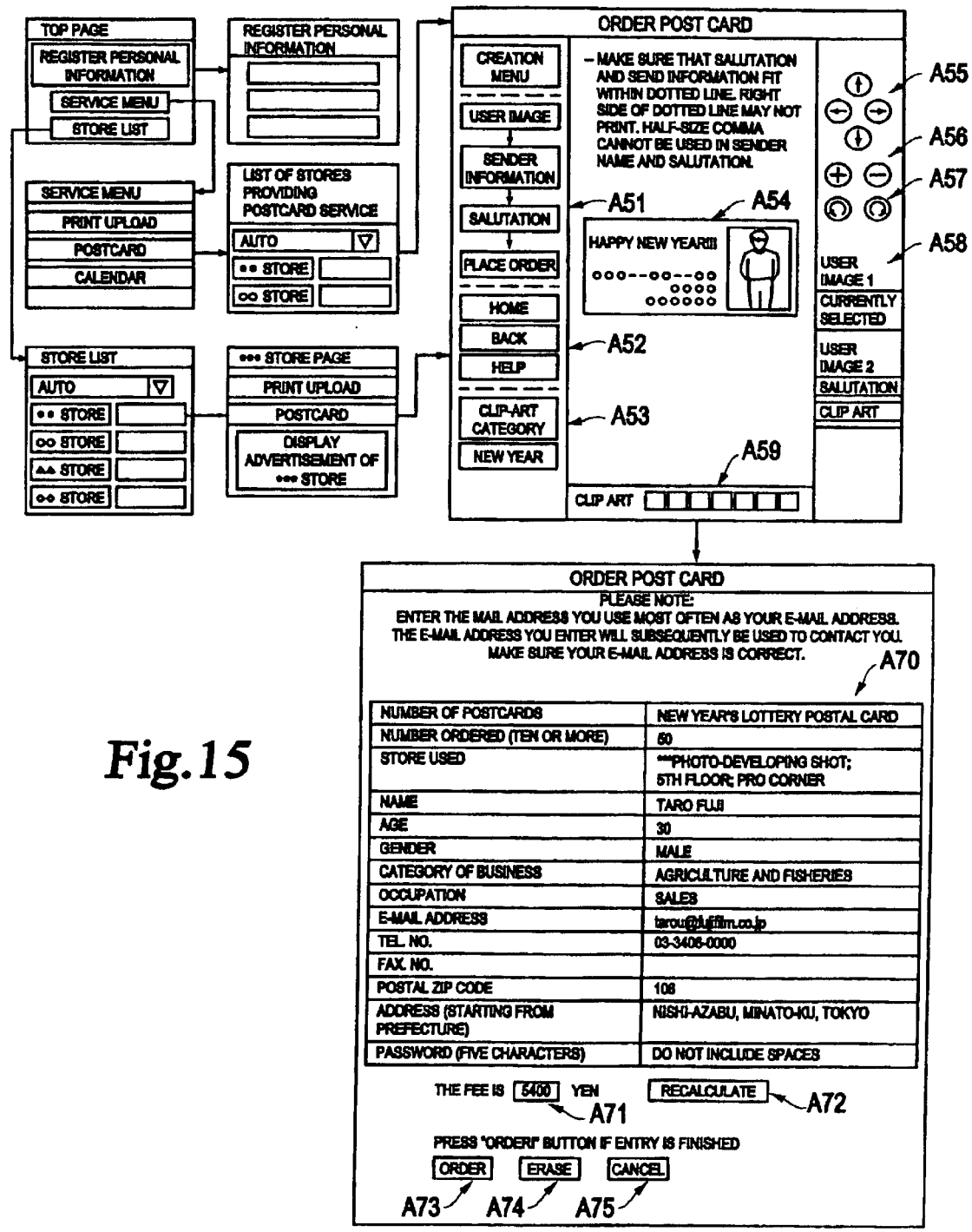
FIG. 15 illustrates the transition of screens on the display unit of a client computer.

FIGS. 11 to 14 are flowcharts showing a processing procedure for ordering the printing of images. FIG. 15 illustrates the transition of screens (windows) on the display unit 19 connected to the client computer 1. FIGS. 16 to 21 show examples of display screens displayed on the display unit 19 connected to the client computer 1.

Figure 16:
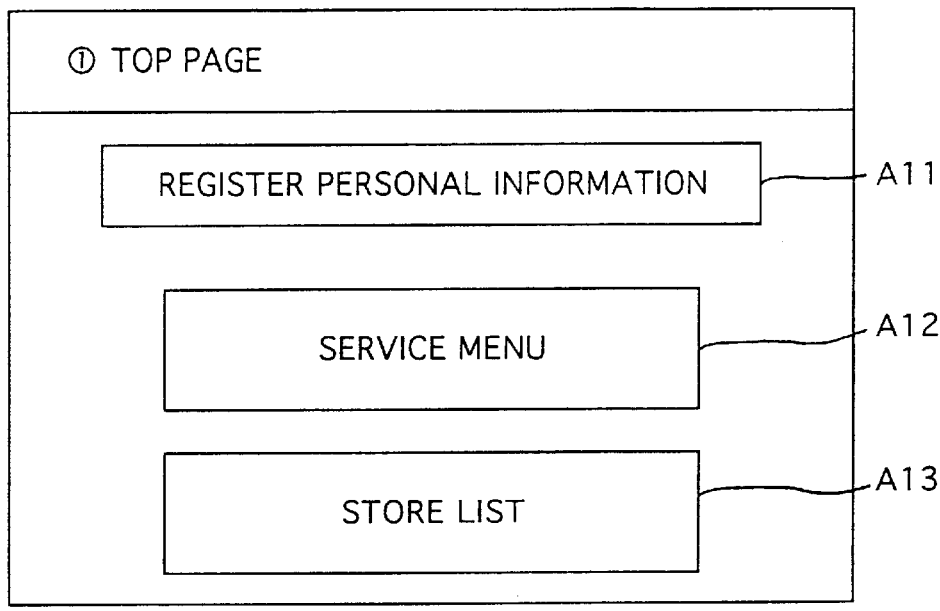

First, the client computer 1 and order-taking server 25 are connected via the Internet, whereupon a top-page screen of the kind shown in FIG. 16 is displayed on the display screen of the display unit 19 of client computer 1 (step 41). The top-page screen includes a personal-information recording area A11, a service menu area A12 and a store list area A13.

Figure 17:
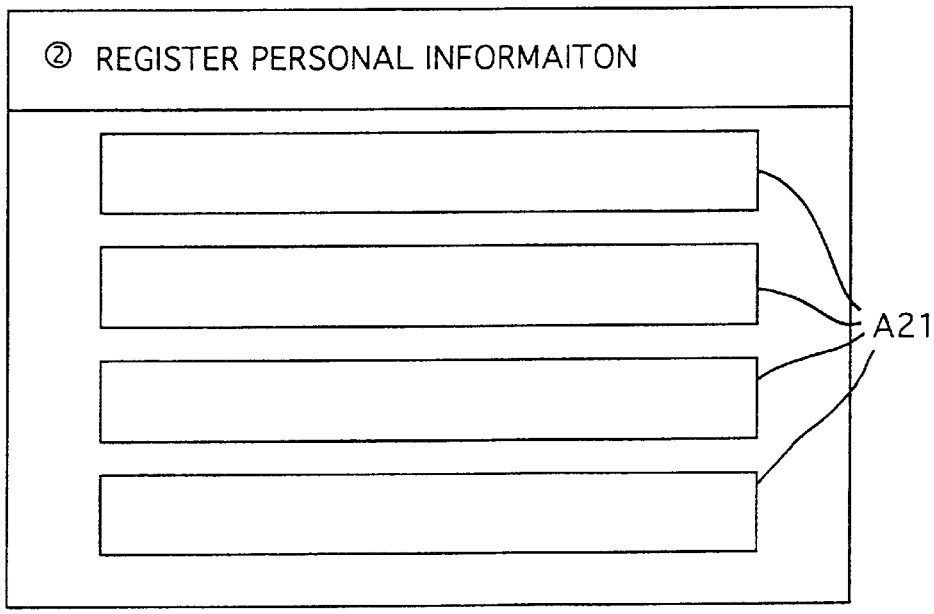

The personal-information recording area A11 is an area clicked on by the user of the client computer 1 when personal information (name, address, telephone number, mailing address, etc., of the user) concerning the user of the client computer 1 is to be entered. If the personal-information recording area A11 is clicked on, a personal-information registration screen shown in FIG. 17 is displayed on the display screen of the display unit 19 of client computer 1. The personal-information registration screen contains areas A21 for displaying personal information that has been entered.

Figure 18:
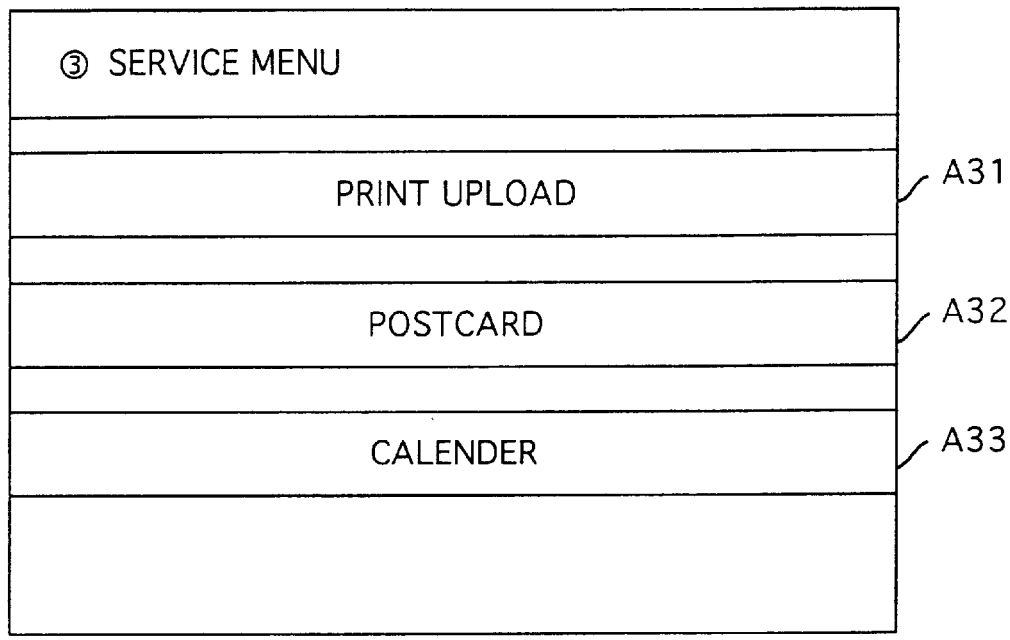
Figure 19:
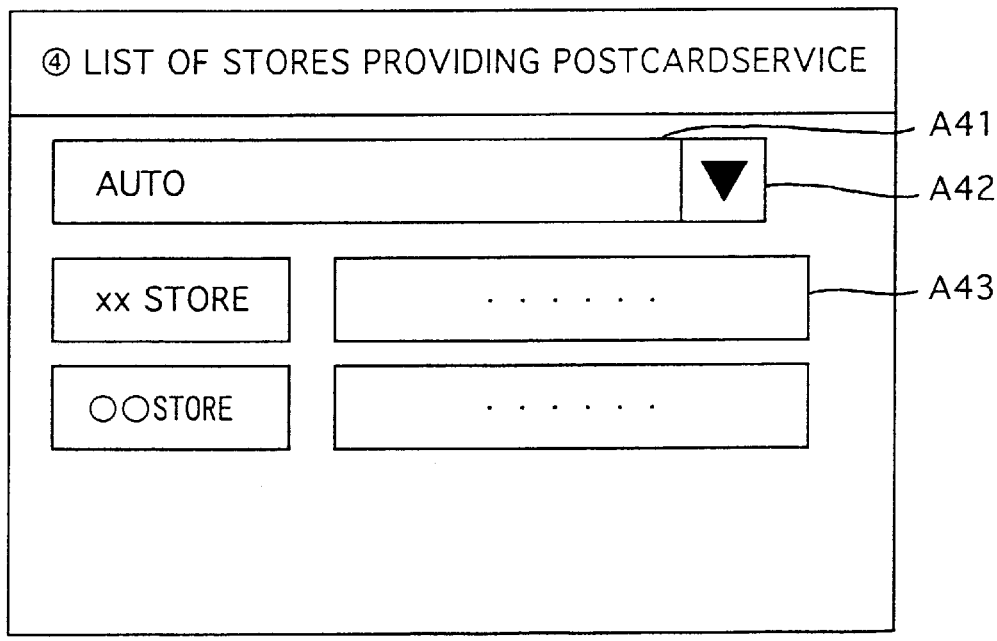

The service menu area A12 is an area clicked on by the user when the content of services capable of being utilized in the image printing system by the user are to be displayed. If the service menu area A12 is clicked on, a service menu screen shown in FIG. 18 is displayed on the display screen of the display unit 19 of client computer 1. The service menu screen contains areas A31, A32 and A33 each representing the content of a service. Upload print area A31 is an area clicked on by the user when image data is to be uploaded from the client computer 1 to the order-taking server 25 and the image represented by the uploaded image data is to be printed using the high-resolution printer connected to the store server 30. Postcard area A32 is an area clicked on by the user when a postcard is to be created. Calendar area A33 is an area clicked on by the user when a calendar is to be created.

The store list area A13 is an area clicked on by the user when the names of stores in which the store server 30 has been installed are to be displayed in the form of a list. If the store list area A13 is clicked on, a store-list display screen (see FIG. 26) is displayed on the display unit 19, as will be described later.

Assume that the service menu area A12 included on the top-page screen has been clicked on by the user of the client computer 1 (step 41). When the service menu area A12 is clicked on, the service-menu display screen shown in FIG. 18 is displayed on the display screen of the display unit 19 of client computer 1 (step 42). Now assume that the postcard area A32 has been clicked on and that a postcard creation service has been selected by the user (step 42).

When the postcard creation service is selected by the user, postcard selection data indicating that the postcard creation service has been selected is transmitted from the client computer 1 to the order-taking server 25 (step 43).

When the postcard selection data is received by the order-taking server 25, the available-service table (see FIG. 5) that has been stored on the hard disk of the order-taking server 25 is read out and the numbers of stores providing the postcard service are retrieved (Search Results 1) (step 71). Data representing Search Results 1 is transmitted from the order-taking server 25 to the client computer 1.

The data representing the Search Results 1 transmitted from the client computer 1 is received by the client computer 1, whereupon a screen (shown in FIG. 19) displaying a list of stores that provide the postcard service is displayed, based upon the Search Results 1, on the display screen of the display unit 19 connected to client computer 1 (step 44).

The screen for displaying the list of stores that provide the postcard service includes an area A41 indicating a method of narrowing down the stores that have been retrieved, an area A42 pulled down when the method of narrowing down stores is to be changed, and an area A43 for displaying stores that have been narrowed down. If stores that have been retrieved are to be narrowed down, first the area A42 is pulled down. Pulling down the area A42 causes the area A41 to display a method of narrowing down stores by using "Area Selection", "Automatic" and "Postal Zip Code". The user selects the desired method from these methods displayed in area A41.

If "Area Selection" is chosen by the user, then an area-selection screen (not shown) is displayed on the display screen of the display unit 19 connected to the client computer 1 (step 45). Areas classified by prefecture (or by more local areas) are displayed on the area-selection screen. The area desired is selected by the user (step 46), and the data representing the selected area is transmitted from the client computer 1 to the order-taking server 25 (step 47).

If "Postal Zip Code" is chosen by the user, then a screen (not shown) for entering a zip code is displayed on the display screen of the display unit 19 connected to the client computer 1 (step 48). The postal zip code desired is entered by the user (step 49), and the data representing the entered postal zip code is transmitted from the client computer 1 to the order-taking server 25 (step 50).

If "Automatic" is chosen by the user, then it is determined whether personal information regarding this user has already been registered (step 51). If this personal information has not been registered ("NO" at step 51), then the personal-information registration screen shown in FIG. 17 is displayed on the display screen of the display unit 19 (step 52). The user enters the personal information (step 53) and the data representing the entered personal information is transmitted from the client computer 1 to the order-taking server 25.

When the personal information is entered, or if the personal information has already been registered, it is determined whether to narrow down the stores based upon postal zip code or based upon the city or town of the user's address (step 54). This determination would be set in advance. It goes without saying that the setting can be changed. In a case where the setting is such that stores are to be narrowed down based upon postal zip code, data representing the postal zip code registered in the personal information is transmitted from the client computer 1 to the order-taking server 25 (step 55). In a case where the setting is such that stores are to be narrowed down based upon city or town, data representing the city or town registered in the personal information is transmitted from the client computer 1 to the order-taking server 25 (step 56).

Since the personal information has been registered in the order-taking server 25, the processing indicated at step 54 may be executed by the order-taking server 25. In such case the processing indicated at steps 55 and 56 would be deleted.

When the data representing the selected area, the data representing the postal zip code or the data representing the city or town is received by the order-taking server 25 (step 72), the content of the data is judged by the order-taking server 25 (step 73).

Upon receiving data representing an area selected by the user, the order-taking server 25 reads out the store basic-information table stored on the hard disk of the order-taking server 25 and retrieves the stores located in the selected area from among the store numbers that fall within Search Results 1 (step 74).

Upon receiving data representing a postal zip code selected by the user, the order-taking server 25 uses the store basic-information table to retrieve stores having the selected postal zip code from among the store numbers that fall within Search Results 1 (step 75).

In a case where the order-taking server 25 retrieves stores based upon the postal zip code that has been registered in the personal information, stores having postal zip codes the same as that registered in the personal information are retrieved (step 76).

In a case where the order-taking server 25 retrieves stores based upon the address that has been registered in the personal information, stores in a city or town the same as the city or town of the address registered in the personal information are retrieved (step 77).

Data representing retrieved stores is transmitted from the order-taking server 25 to the client computer 1 (step 78).

If the client computer 1 receives data representing the retrieved stores transmitted from the order-taking server 25, the list of store names represented by the data representing these stores is displayed in the area A43 of the screen displaying the list of stores providing the postcard service (step 57). The user selects a desired store from the list of store names displayed in area A43 (step 58).

Figure 20:
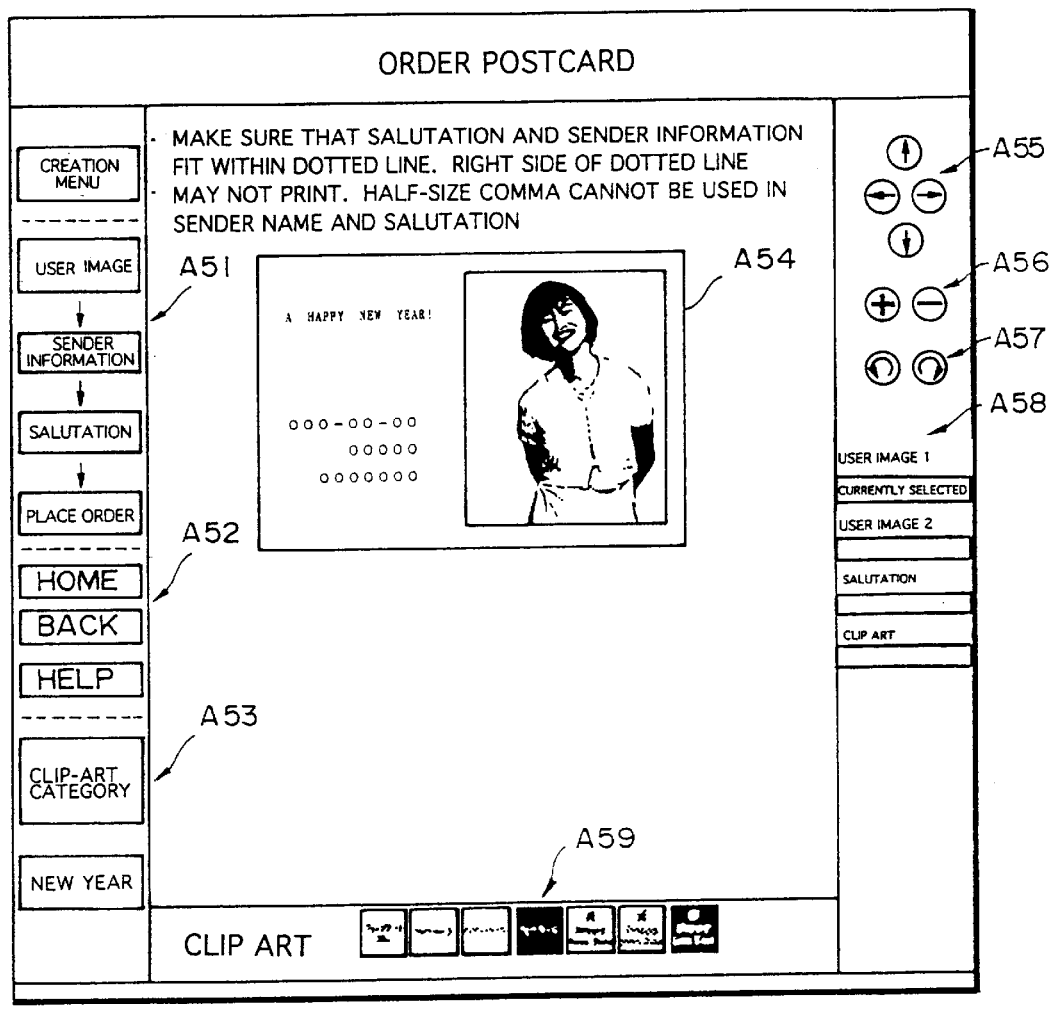

When a store is selected, a postcard creation screen shown in FIG. 20 is displayed on the display screen of the display unit 19 connected to the client computer 1 (step 59).

The postcard creation screen includes an area A51 for displaying a postcard creating procedure; an area A52 for displaying a home button, a back button and a help button; an area 53 for selecting a category of clip art; and a postcard display area A54. The postcard creation screen further includes an area A55 clicked on by the user when an image to be used in creating the postcard is positioned; an area A56 clicked on by the user when the image is to be enlarged or reduced in size; an area A57 clicked on by the user when the image is to be rotated; an area A58 for selecting an image to be positioned; and an area A59 in which clip art is displayed.

The user creates a postcard while clicking on the various areas displayed on the postcard creation screen.

When a postcard is created, a postcard template and an image to be combined with the postcard are necessary. These items of data may be possessed by the user of the client computer 1 per se or may be possessed by the order-taking server 25 and downloaded from this server. Any either case, the desired postcard is created by the user of the client computer 1. The image representing the created postcard is displayed in area A54 on the postcard creation screen.

When a postcard is created, a postcard ordering screen shown in FIG. 21 is displayed on the display screen of the display unit 19 of the client computer 1 (step 60). The postcard ordering screen includes a field A70 for entering the type of card, the number of cards ordered, the store that excepts the order, name, name in katakana, age, gender, category of business, occupation, e-mail address, telephone number, facsimile number, postal zip code, address and password. The postcard ordering screen further includes an area A72 clicked on by the user when a user fee is to be recalculated; an area A73 clicked on by the user when a postcard is to be ordered; an area A74 clicked on by the user when order information that has been entered is to be erased; and an area A75 clicked on by the user when an order is to be canceled.

The order information is thus entered by the user. When the entry of order information is finished, the data representing the entered order information is transmitted from the client computer 1 to the order-taking server 25.

When the order information is received by the order-taking server 25, the latter calculates the user fee based upon the order information (step 79). Processing for calculating user fees will be described later in greater detail. When a user fee has been calculated, the data representing the calculated user fee is transmitted from the order-taking server 25 to the client computer 1.

When the data representing the user fee is received by the client computer 1, the user fee represented by this data is displayed in an area A71 on the postcard ordering screen (step 61). The area A73 is clicked on by the user when the user fee is to be confirmed by the user. As a result, an order for the creation of the postcard is sent from the client computer 1 to the order-taking server 25 (step 62).

When the order-taking server 25 receives the data representing the order from the client computer 1, the order information, as well as the template data and the image data for creating the postcard, is transmitted to the store server 30 selected by the user (step 80).

The store server 30 receives the order information, template data and image data transmitted from the order-taking server 25 (step 91). On the basis the data received, the store server 30 then executes image processing, such as the combining of images, for creating the postcard (step 92). When the image processing is completed, the ordered number of postcards are printed by the high-resolution printer connected to the store server 30 (step 93).

Image processing such as the combining of images may be executed by the order-taking server 25 rather than by the store server 30. In this case the data that has been subjected to image processing would be transmitted from the order-taking server 25 to the store server 30. Further, the printing of an image may be performed by the printer of the order-taking server 25 rather than by the store server 30. In this case the printed matter would be mailed to the store by the operator of the order-taking server 25.

Figure 13:
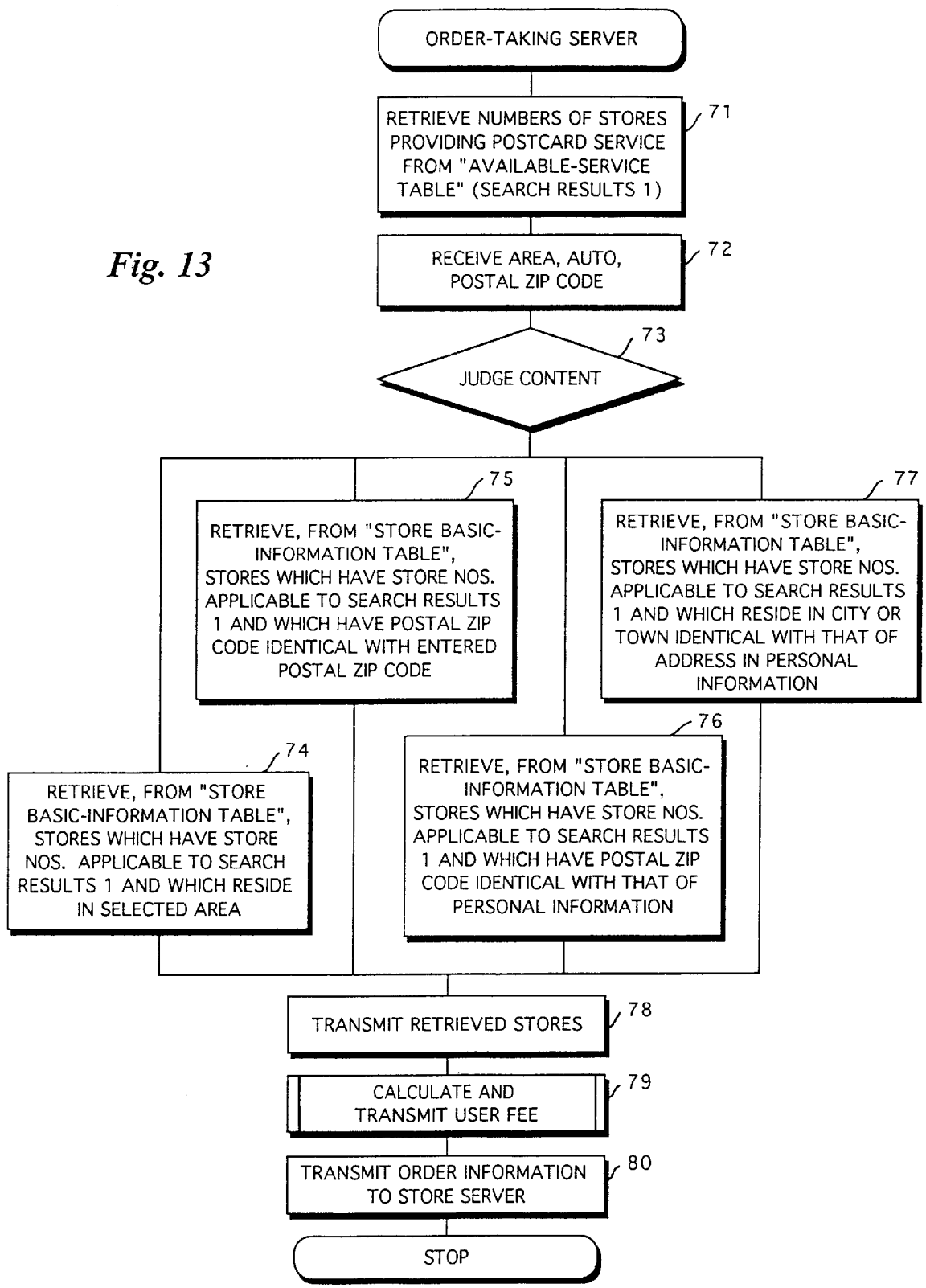
FIG. 13 illustrates the processing procedure of an order-taking server.
Figure 14:
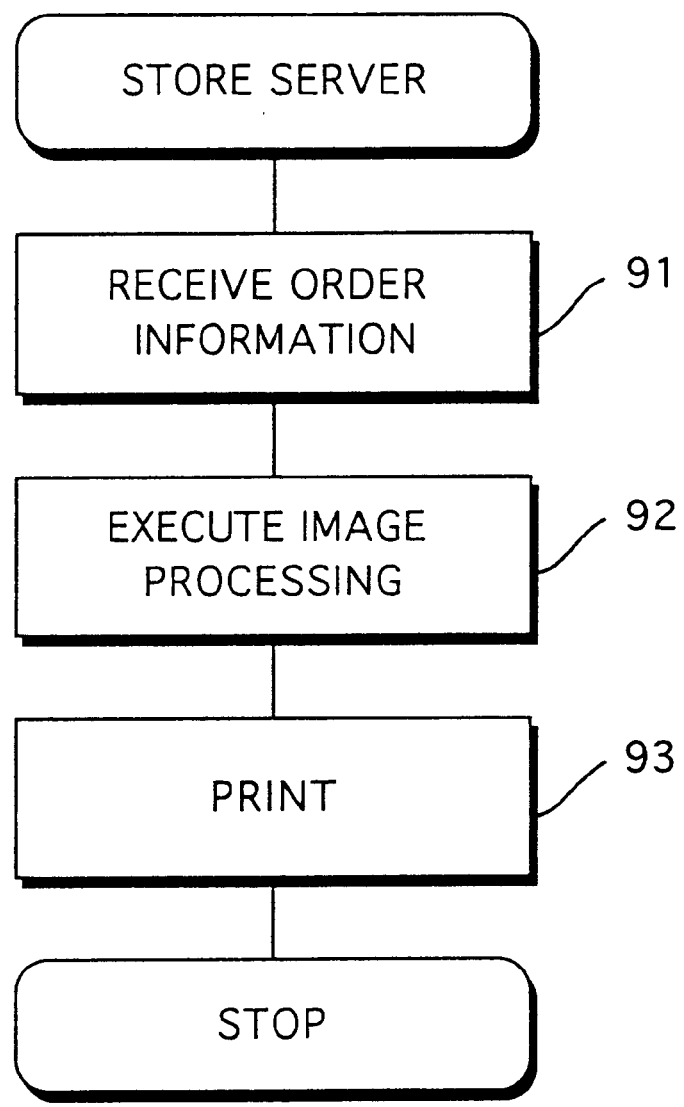
FIG. 14 illustrates the processing procedure of a store server.
Figure 22:
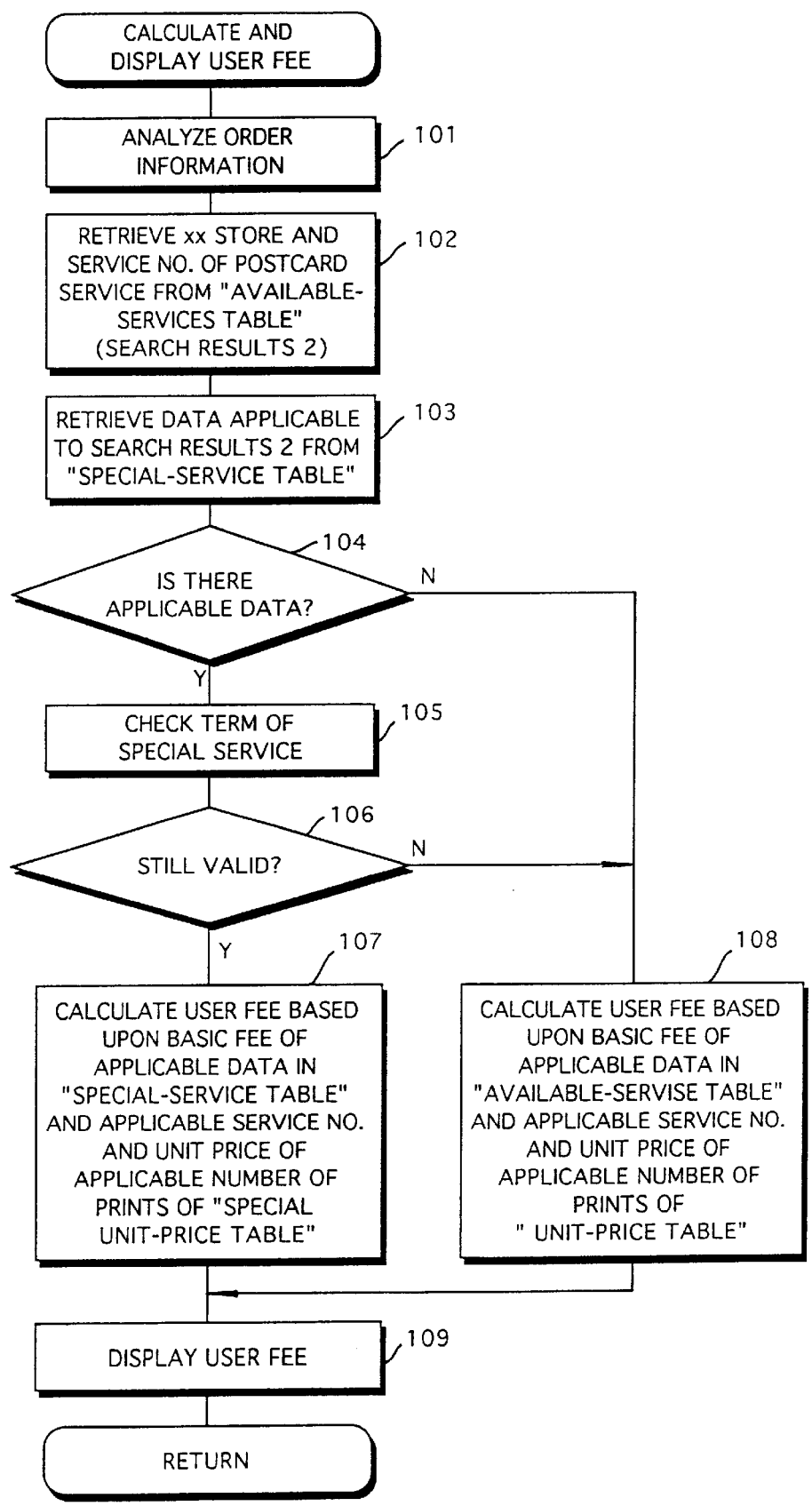
FIG. 22 illustrates a processing procedure for calculating user fees.

FIG. 22 is a flowchart showing the procedure for calculating user fees (step 79 in FIG. 13).

First, the order information is analyzed (step 101). The table of available services stored on the hard disk of the order-taking server 25 is read out and the service number of the postcard service at the store specified by the analyzed order information is retrieved (step 102). When the service number is found, a search is performed to determine whether the service number found has been stored in the table of special services (step 103).

If the service number is found in this table ("YES" at step 104), it is determined whether the term of special service is still valid (step 105). If the term of the special service is still valid ("YES" at step 106), an applicable basic fee is retrieved from the table of special services, the applicable unit price is retrieved from the table of special unit prices, and the user fee is calculated in dependence upon the number of prints ordered (step 107).

If data conforming to the search results is not present in the table of special services or if such data is present in this table but the term of the special service is not valid ("NO" at step 104 or 106), the asic fee in the table of available services and applicable unit price in the table of unit prices are retrieved and the user fee is calculated in dependence upon the number of prints ordered (step 108).

The data representing the calculated user fee is transmitted to the client computer 1, as mentioned above, so as to be displayed on the display unit 19 connected to the client computer 1, and is displayed on the display unit of the order-taking server 25 so that it may be confirmed by the operator of the order-taking server 25.

Figure 11:
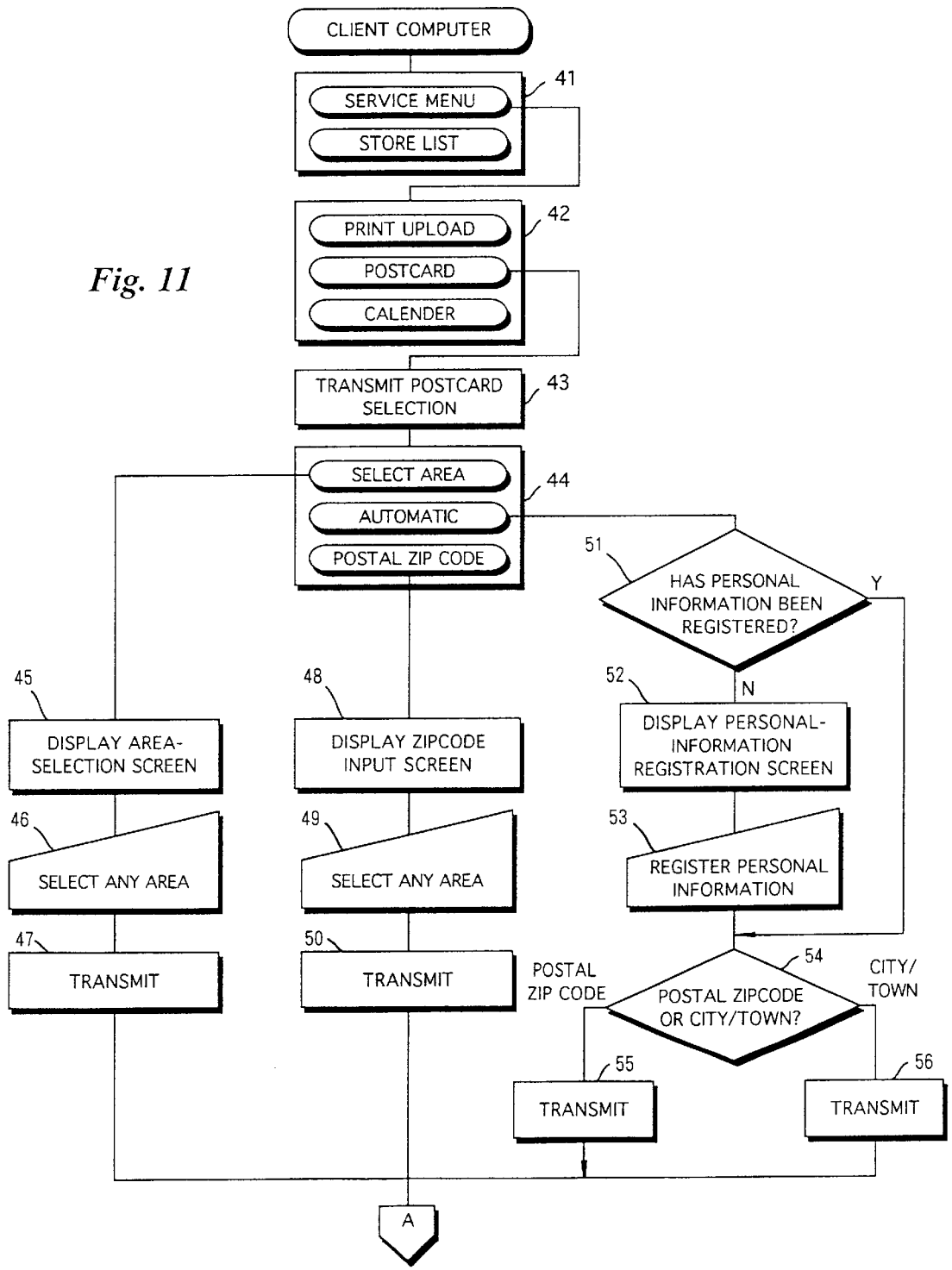
FIGS. 11 and 12 are flowcharts illustrating the procedure of print ordering processing.
Figure 12:
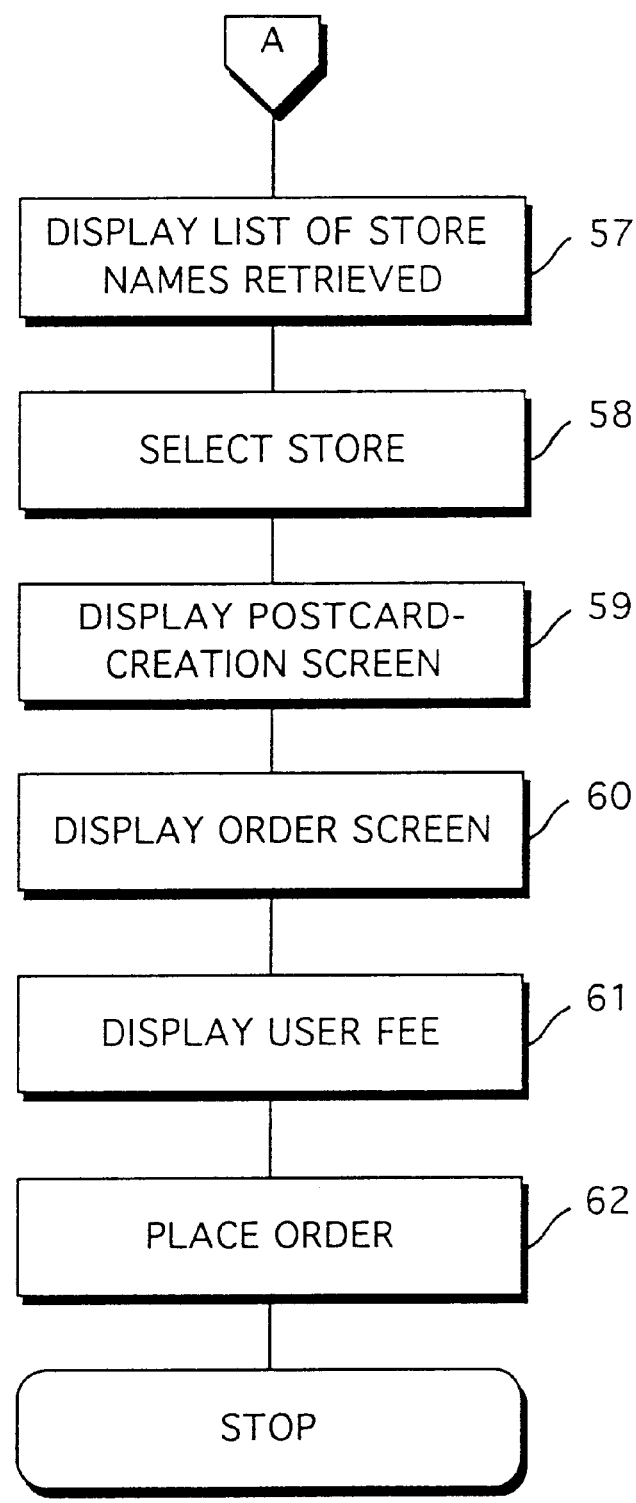
Figure 23:
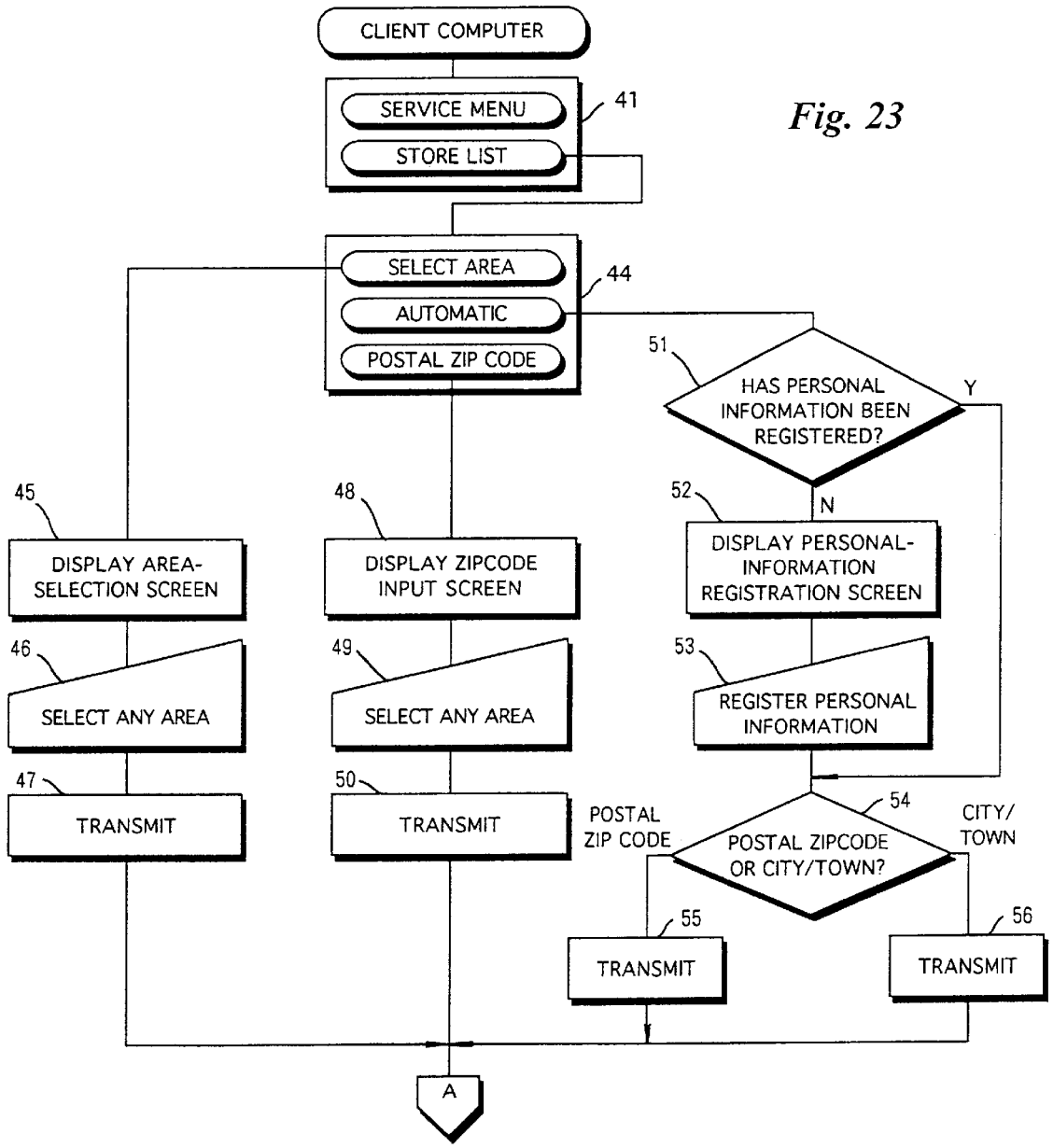
FIGS. 23 to 25 are flowcharts illustrating a processing procedure for ordering printing.
Figure 24:
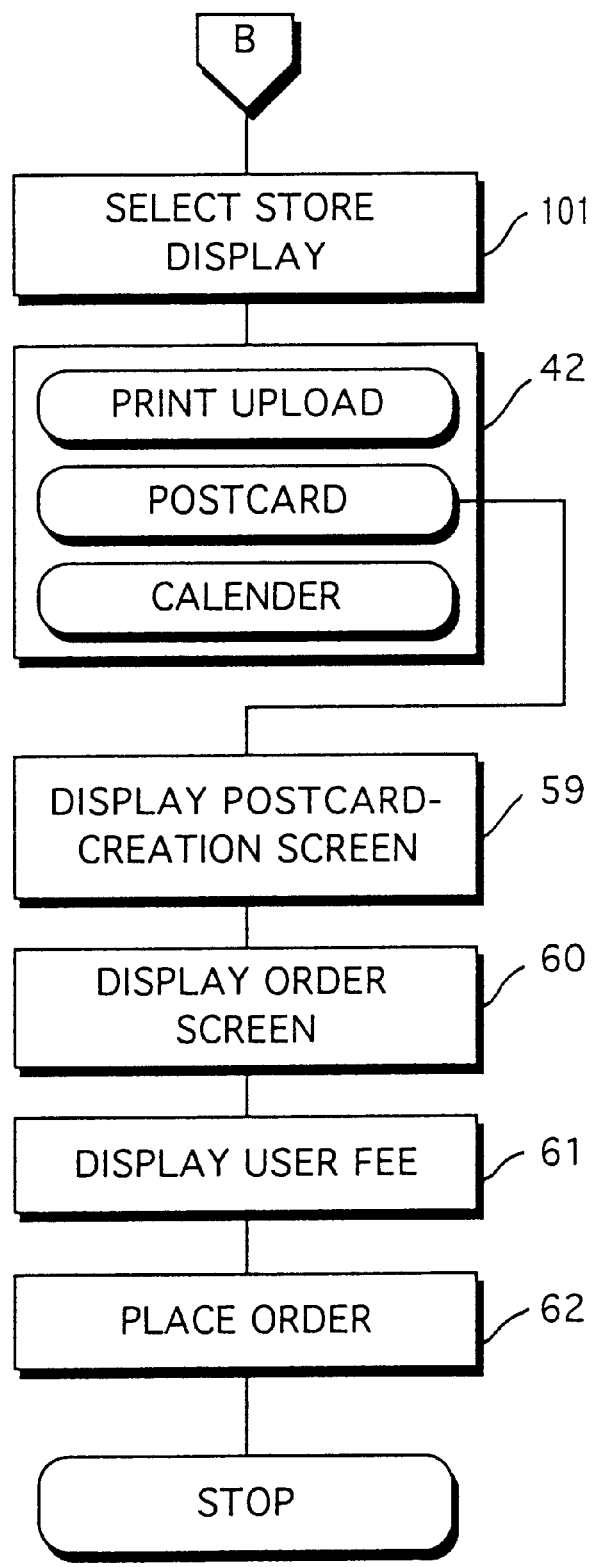
Figure 25:
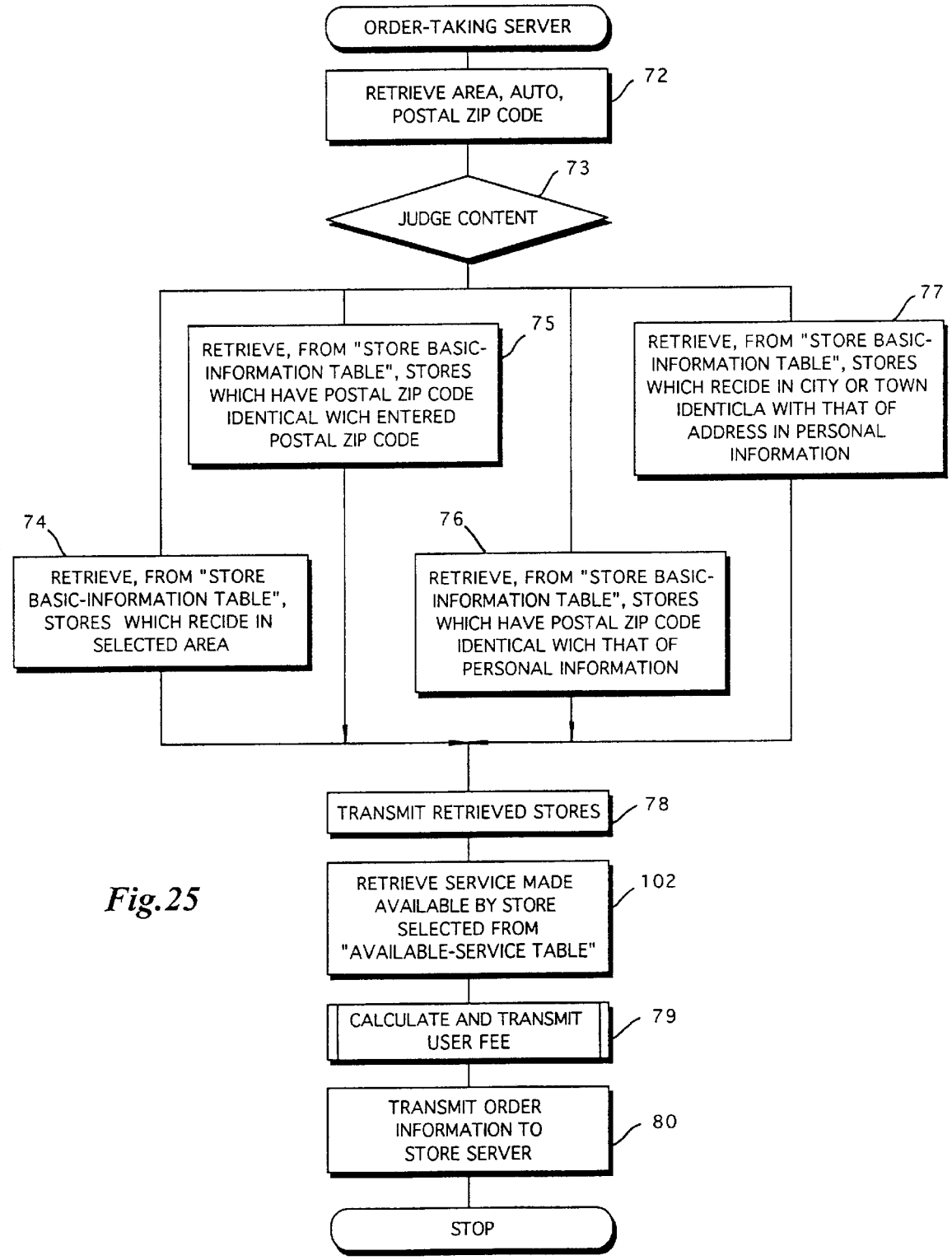
Figure 26:
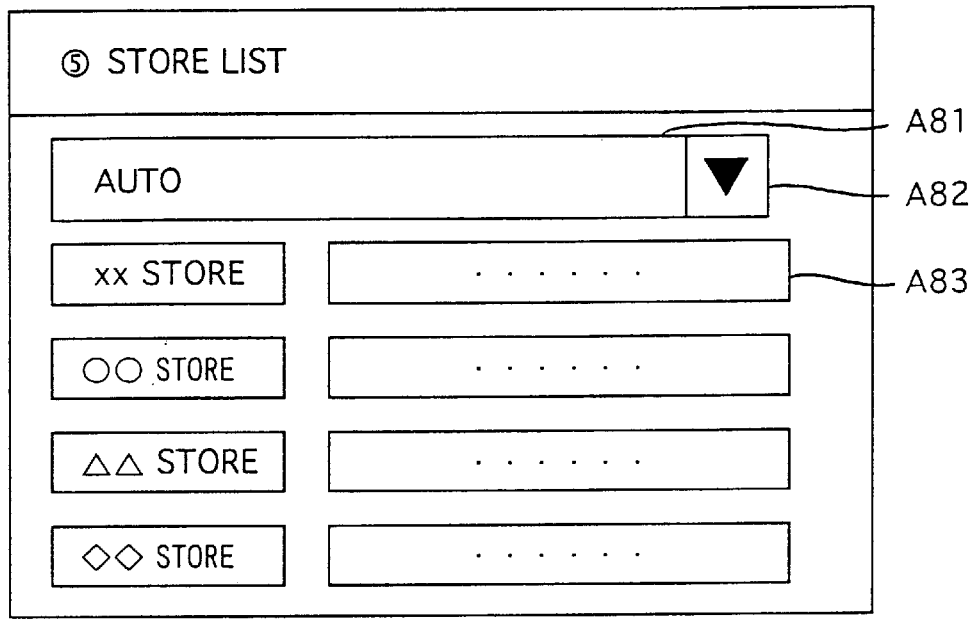
FIGS. 26 and 27 illustrate examples of display screens.
Figure 27:
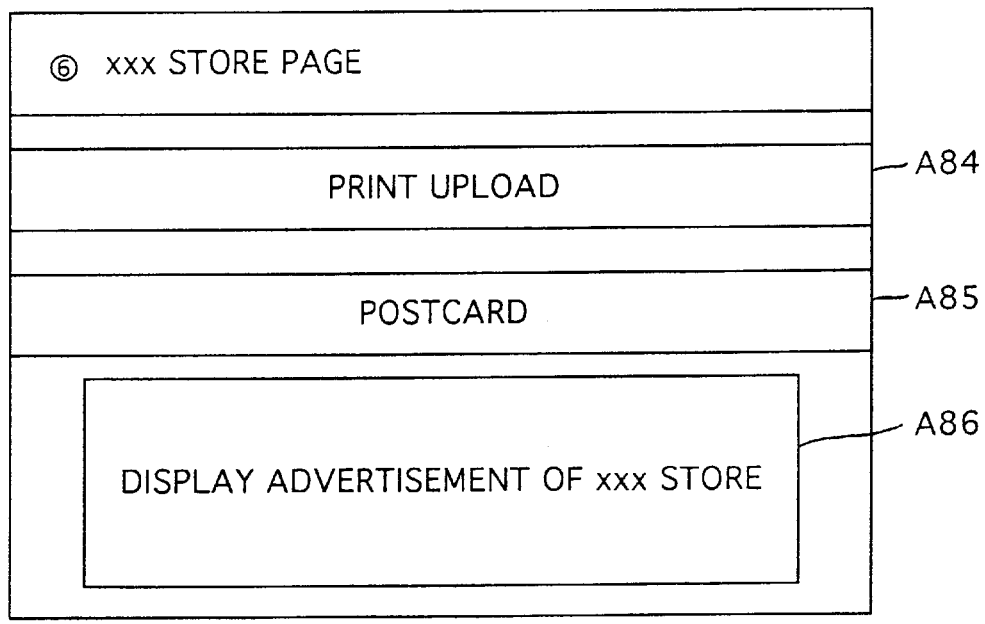

FIGS. 23 to 25 are flowcharts showing a processing procedure for ordering the printing of an image. Processing steps identical with those of FIGS. 11 to 13 are designated by like step numbers and are not described again. FIGS. 26 and 27 illustrate examples of screens displayed on the display unit 19 of the client computer 1.

The embodiment illustrated in FIGS. 23 to 27 is for an instance where the service menu area A12 has been clicked on the top menu screen displayed on the display unit 19 of client computer 1.

If the area A12 is clicked on by the user when the top page screen (see FIG. 16) is being displayed on the display unit 19 of the client computer 1 (step 41), the screen of the list of stores shown in FIG. 26 is displayed on the display unit 19 (step 44).

The screen of the list of stores includes an area 81 for selecting a method of narrowing down stores, a pull-down area A82 and store display area A83, these areas being similar to those of the screen showing the list of stores providing the postcard service.

In a manner similar to that of the screen showing the list of stores providing the postcard service, stores located in an area found by retrieval based upon an area selected by the user (steps 45, 46, 47), stores located in an area found by automatic retrieval (steps 48, 49, 50) and stores located in an area based upon postal zip code (steps 51 to 56) are displayed in the area A83. The user selects a desired store from the stores displayed in the area A83 (step 101).

When a desired store has been selected by the user, the data representing the selected store is transmitted from the client computer 1 to the order-taking server 25.

The order-taking server 25 receives the data representing the selected store from the client computer 1. Services made available by the store selected by the user of the client computer 1 are retrieved from the table of available services (step 102). Further, the text constituting the advertisement of the selected store is retrieved from the table of advertisement characters. The content constituting the advertisement of the selected store is retrieved from the table of advertisement content.

When the services being provided by the selected store, the advertisement text of this store as well as the advertisement content thereof have been found, the data representing the items found is transmitted from the order-taking server 25 to the client computer 1 (step 79).

When the data such as that representing the services being provided by the selected store is received by the client computer 1, the selected-store page screen shown in FIG. 27 is displayed on the display unit 19 of the client computer 1 (step 42). The services being provided by the selected store and the advertisement of the selected store are displayed on the store page screen.

Here the selected store is providing an upload print service and a postcard creation service. An upload print area A84 clicked on by the user when upload printing is to be performed, a postcard area A85 clicked on by the user when a postcard is to be created, and an advertisement area A86 are displayed on the store page screen.

When a postcard is to be created, the area A84 is clicked on by the user and postcard creation processing is executed (steps 59, 60). The user fee that accompanies the postcard creation processing is calculated and displayed on the display unit 19 of the client computer 1. Subsequent processing is similar to that in the case where the user clicked on the service menu area A12 on the top page screen in the manner described above.

Figure 28:
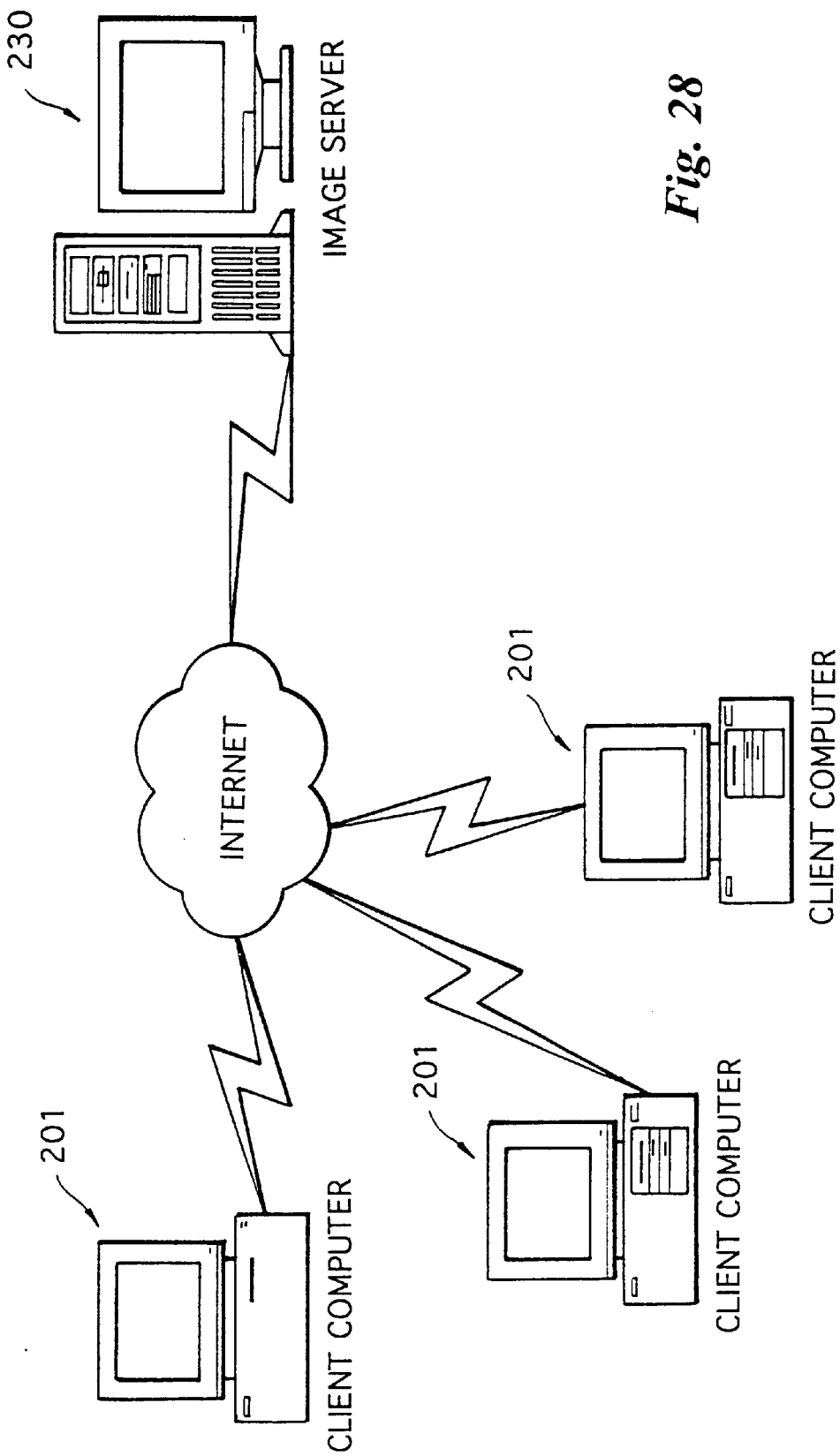
FIG. 28 illustrates the general configuration of a system for editing printed images.

(B) Second Embodiment (1) General Configuration of System for Printing Edited Images FIG. 28 is a block diagram showing the general configuration of a system for printing edited images according to the second embodiment.

The system for printing edited images comprises a client computer 201 and an image server 230 connected via the Internet. The client computer 201 and image server 230 are capable of communicating data with each other via the Internet.

This system is such that the user of the client computer 201 performs image editing using the client computer 201 and transmits editing information necessary for image editing, image data and order information for ordering purposes to the image server 230. The latter generates an edited image using the editing information, etc., transmitted from the client computer 201 and prints the edited image generated. The edited image that has been printed is mailed to the user of the client computer 201 by the operator of the image server 230. It is of course permissible to adopt an arrangement in which edited image that has been printed is mailed not to the residence of the user of client computer 201 but to a photo lab (a photo-developing hop), in which case the user would go to the lab to ick up the print.

Three client computers 201 and one image server 230 are illustrated in FIG. 28. However, it goes without saying that one, two, four or more client computers 201 or two or more image servers 230 may be connected.

The electrical construction of the client computer 1 is the same as that shown in FIG. 2.

The construction of the image server 230 also is substantially the same as that of the client computer 201. It goes without saying that the printer connected to the image server 230 would have a resolution higher than the printer connected to the client computer 201.

(2) Image Editing

Image editing processing performed by the user of the client computer 201 will now be described.

Figure 29:
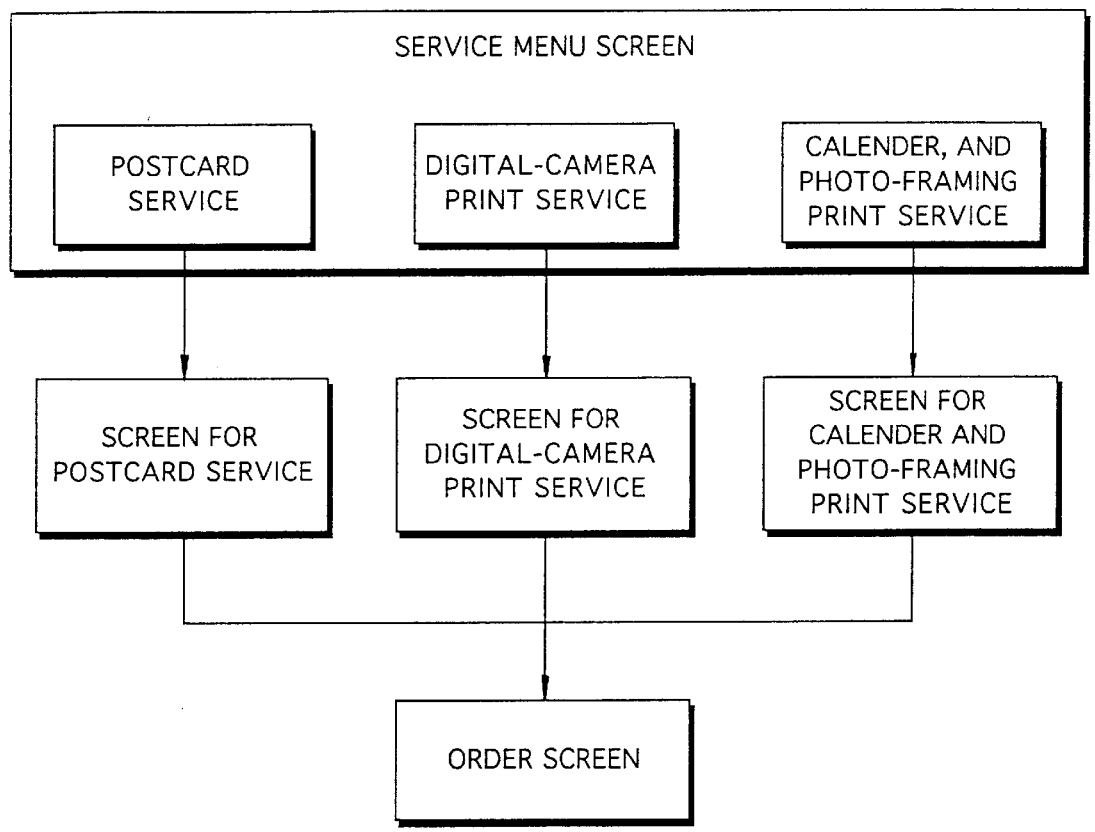
FIG. 29 illustrates the transition of display screens on the display unit of a client computer.

FIG. 29 illustrates the transition of display screens on the display unit 19 of the client computer 201.

In this embodiment, printing of postcards (a postcard service), printing of images represented by image data obtained by a digital camera (a digital-camera print service) and printing of calendars and framed photos (a calendar and photo-framing service) are carried out by the image server 230.

First, a service menu screen is displayed on the display unit 19 of the client computer 201. A service that the user of the client computer 201 wishes to be utilized is selected by the user from the postcard service and digital-camera print service displayed on the service menu screen. A service screen is displayed on the display screen of the display unit 19 of the client computer 201 in conformity with the selected service.

Image editing is to be performed. An order screen (not shown) also is displayed at the same time as the service screen. The order information, which includes personal information such as the name of the user, is entered using the order screen. Of course, it may be so arranged that the order screen is displayed after image editing.

(i) Image Editing in Postcard Service

Figure 30:
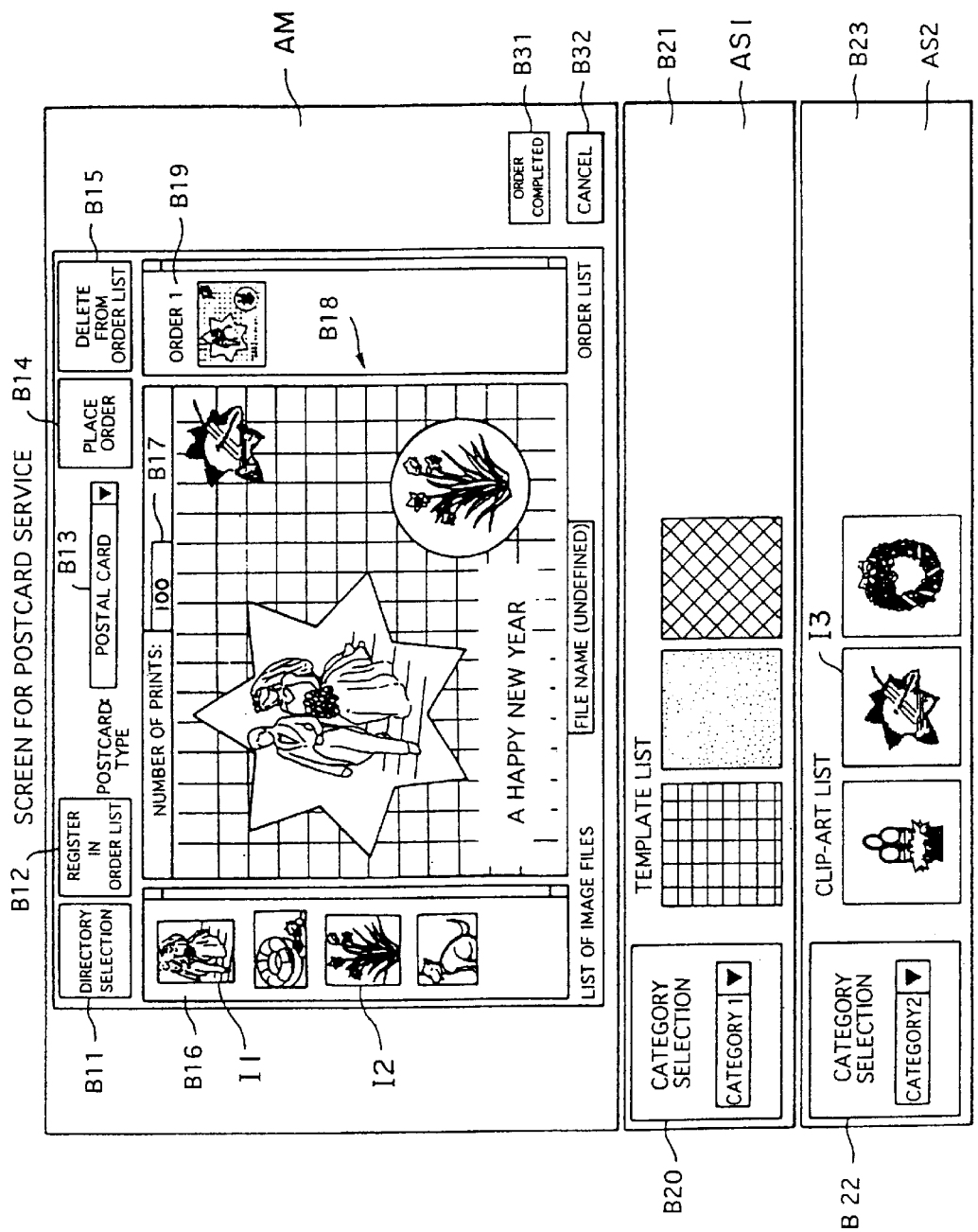
FIG. 30 illustrates the screen of a postcard service.
Figure 31:
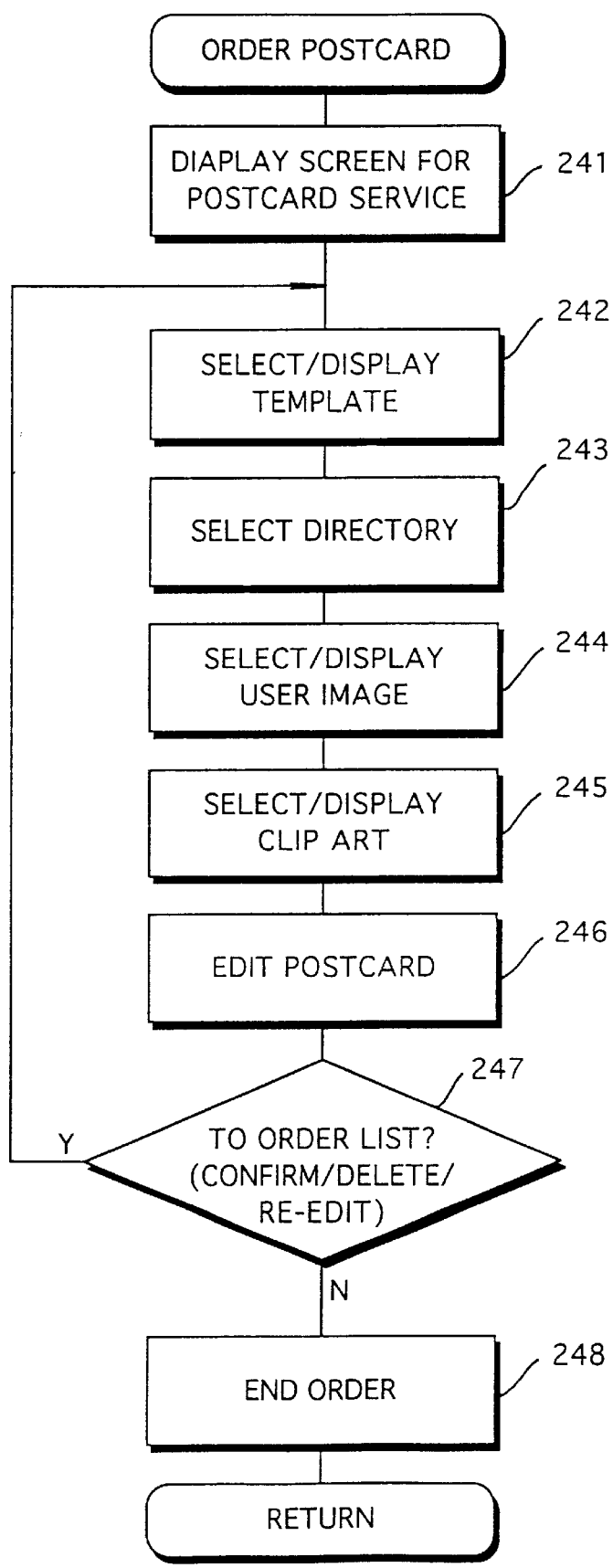
FIG. 31 illustrate a procedure for ordering a postcard.

FIG. 30 illustrates an example of a screen displayed on the display unit 19 of the client computer 201 in a case where the postcard service is received, and FIG. 31 is a flowchart illustrating a processing procedure in a case where a postcard is ordered in the postcard service.

The postcard service screen has a main display area AM, a first subordinate display area AS1 and a second subordinate display area AS2.

The main display area AM includes the following areas:

Directory Area B11

This is an area clicked on by the user when a directory of user images to be combined with a postcard is selected. (The user images are images in the possession of the user. They are stored on the hard disk of the client computer 201 and are referred to as desired images.)

Order-List Registration Area B12

This is an area clicked on by the user when it has been decided to place an order.

Postcard-Type Display Area B13

This area displays the type of postcard (official postcard, New Year's lottery postal card, private postcard, etc.). A list of postcard types is displayed by pulling down the area B13.

Ordering Area B14

This area is clicked on by the user when an order is placed.

Deletion Area B15

This is an area clicked on by the user when an order is to deleted from the order list.

Image-File List Area B16

This is an area for displaying a user image represented by an image file in the selected directory.

Print-Count Display Area B17

This area displays the number of prints.

Edited-Image Display Area B18

This area displays an image being edited and an edited image.

Order List Area B19

This area displays a list of order names and thumbnail images of edited images that have been ordered.

Order Completion Area B31

This area is clicked on by the user when the placing of an order has been completed.

Cancellation Area B32

This area is clicked on by the user when an order is to canceled.

The first subordinate display area AS1 is an area for selecting a template image. The first subordinate display area AS1 includes a category selection area B20 for selecting a template category, and a template-list area B21 for displaying a list of templates.

The second subordinate display area AS2 is for selecting clip art. The second subordinate display area AS2 has clip-art selection areas B22 and B23 for selecting clip art.

The postcard service screen shown in FIG. 30 is displayed on the display screen of the display unit 19 of client computer 201 by selecting the postcard service on the service menu screen in the manner described above (step 241).

The category selection area B20 is clicked on by the user so that a list of template images in a desired category is displayed in the template-list area B21. The desired template image in the displayed template list is clicked on by the user. The template is thus selected (step 242). The template image selected is displayed in the edited-image display area B18.

If the directory selection area B11 is clicked on by the user to select the desired directory, the user images of the selected directory are displayed as a list in the image-file list area B16. The user selects user images by clinking on desired images among the list of user images displayed (step 244). The positions at which the user images are to be placed are designated on the template image being displayed in the edited-image area. The selected user images are superimposed on the designated positions. Here user images I1 and I2 are selected, the user image I1 is placed at the upper left of the template image, and the user image I2 is placed at the lower right of the template image.

Next, the clip-art category selection area B22 is clicked on by the user, whereby a list of clip art in the desired category is displayed in the clip-art list area B23. The user clicks on the desired clip art in the displayed list of clip art. The clip art is thus selected (step 245). The placement position of the selected clip art on the template image is designated by the user. (By way of example, the positions placed in the edited-image area B18 are designated by being clicked.)

The positions of the user images and the position of the clip art can be adjusted. If necessary, text is inserted on the edited image (postcard editing; step 246). In the example shown in FIG. 30, text to the effect "Happy New Year" has been inserted at the lower left of the edited image. The text would be entered from the keyboard 6 and the insertion position would be designated by the mouse 5.

When editing of the image is finished, the user clicks on the order-list registration area B12 to create a thumbnail image of the edited image. The thumbnail image of the edited image is displayed together with the order name in the order list area B19 (step 247). If there is not another order, the order completion area B31 is clicked on to end the ordering operation (step 248). If there is another order, the processing of steps 242 to 247 is repeated.

(ii) Image Editing in Digital-Camera Printing Service

Figure 32:
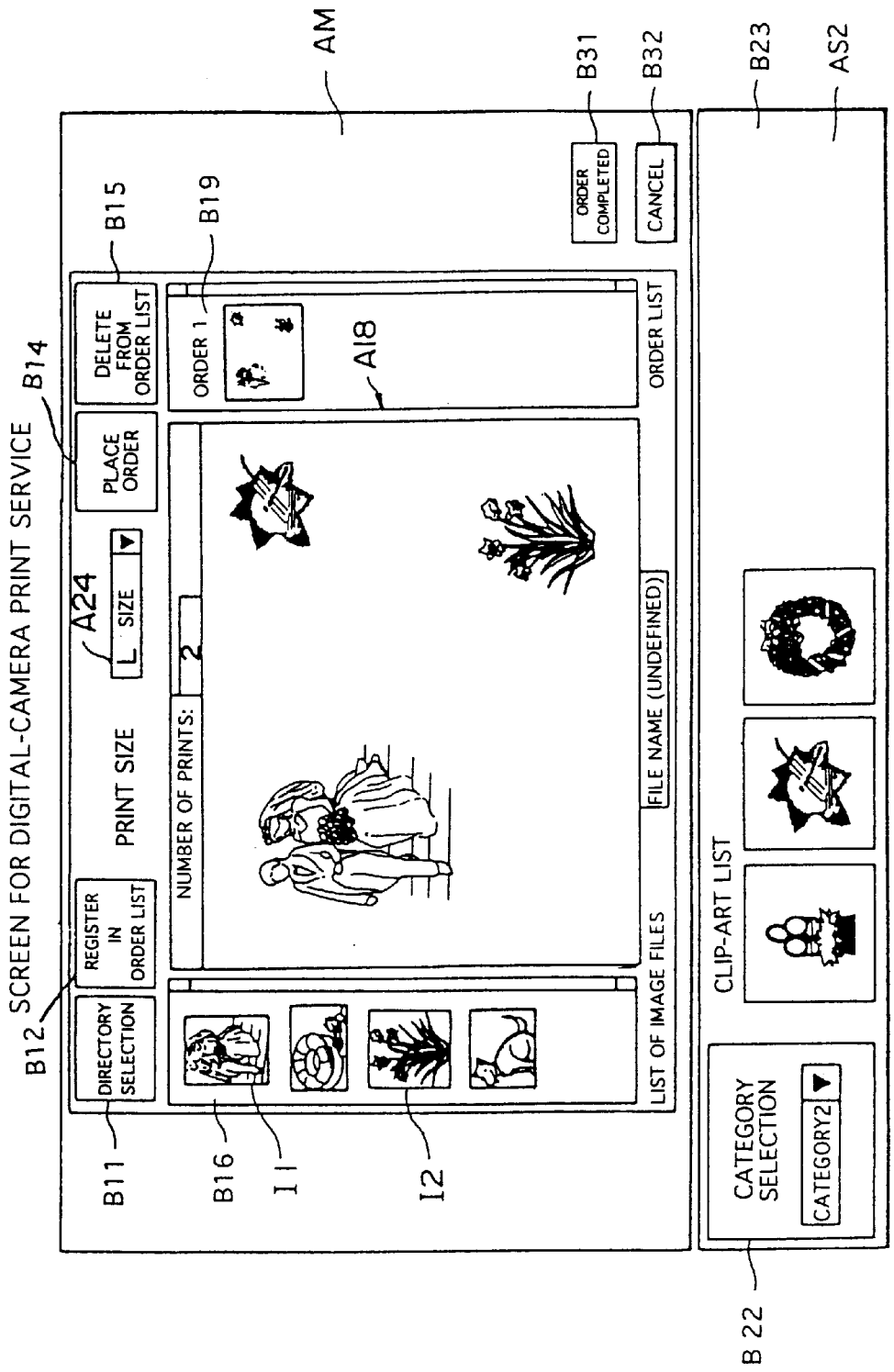
FIG. 32 illustrates the screen of a service for making prints from a digital camera.
Figure 33:
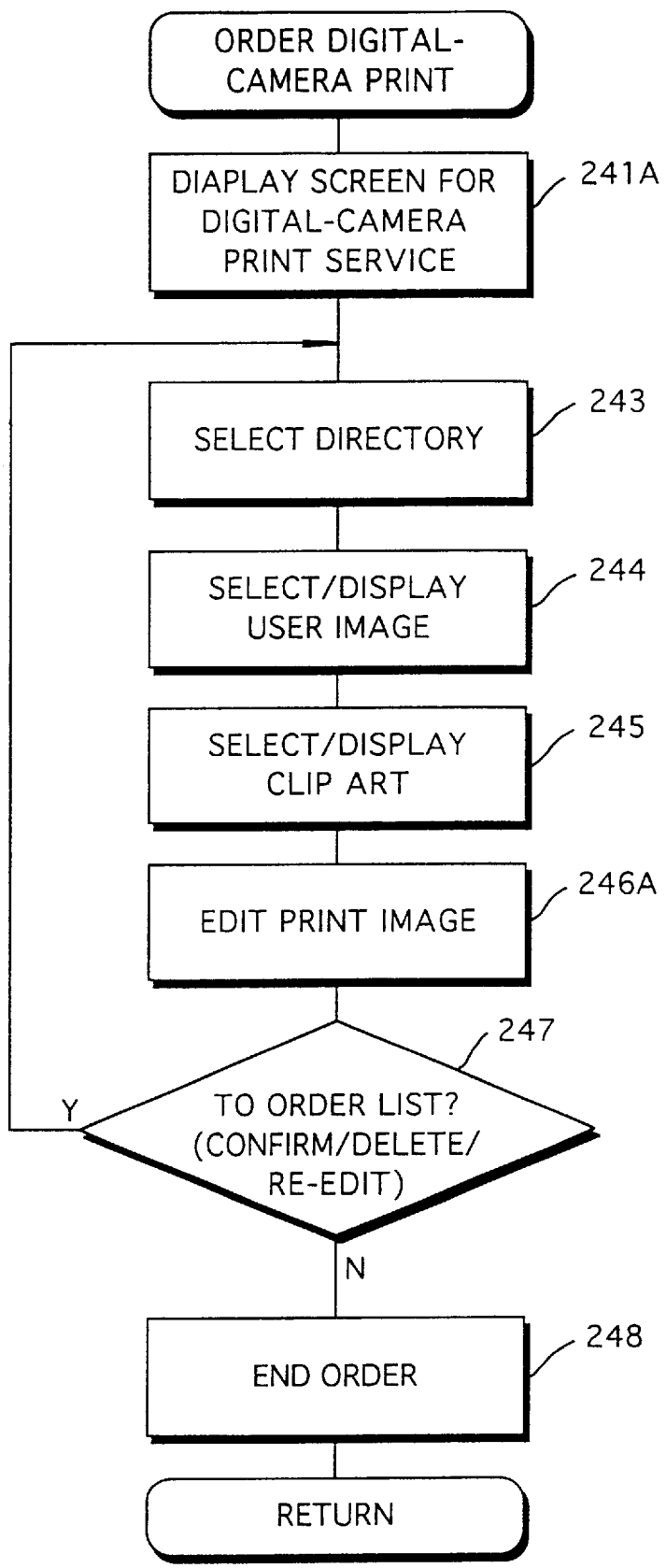
FIG. 33 illustrates processing for ordering digital-camera prints.

FIG. 32 illustrates an example of a screen displayed on the display screen of the display unit 19 of client computer 201 when an image is edited in the digital-camera print service. Areas in FIG. 32 having functions identical with those shown in FIG. 30 are designated by like reference characters and are not described again. FIG. 33 is a flowchart showing the processing procedure of the digital-camera print service. Processing steps identical with those of FIG. 31 are designated by like step numbers and are not described again.

As shown in FIG. 32, the screen of the digital-camera print service has an area B24 for displaying the size of a print. Pulling down the area B24 causes various print sizes to be displayed. The user selects a desired print size from the displayed print sizes.

The screen of the digital-camera print service does not include a subordinate area AS1 which, in comparison with the postcard service screen, is for selecting a background image.

When the digital-camera print service is selected on the service menu screen, the digital-camera print service screen shown in FIG. 32 is displayed on the display screen of the display unit 19 of client computer 201 (step 241A).

Editing of a print image is carried out as by selecting a user image or selecting clip art after the digital-camera print service screen is displayed (step 246A). When editing of an image to be printed is finished, the area B31 is clicked on by the user, thereby completing the order (step 248).

(iii) Image Editing Calendar and Photo-Framing Service

Figure 34:
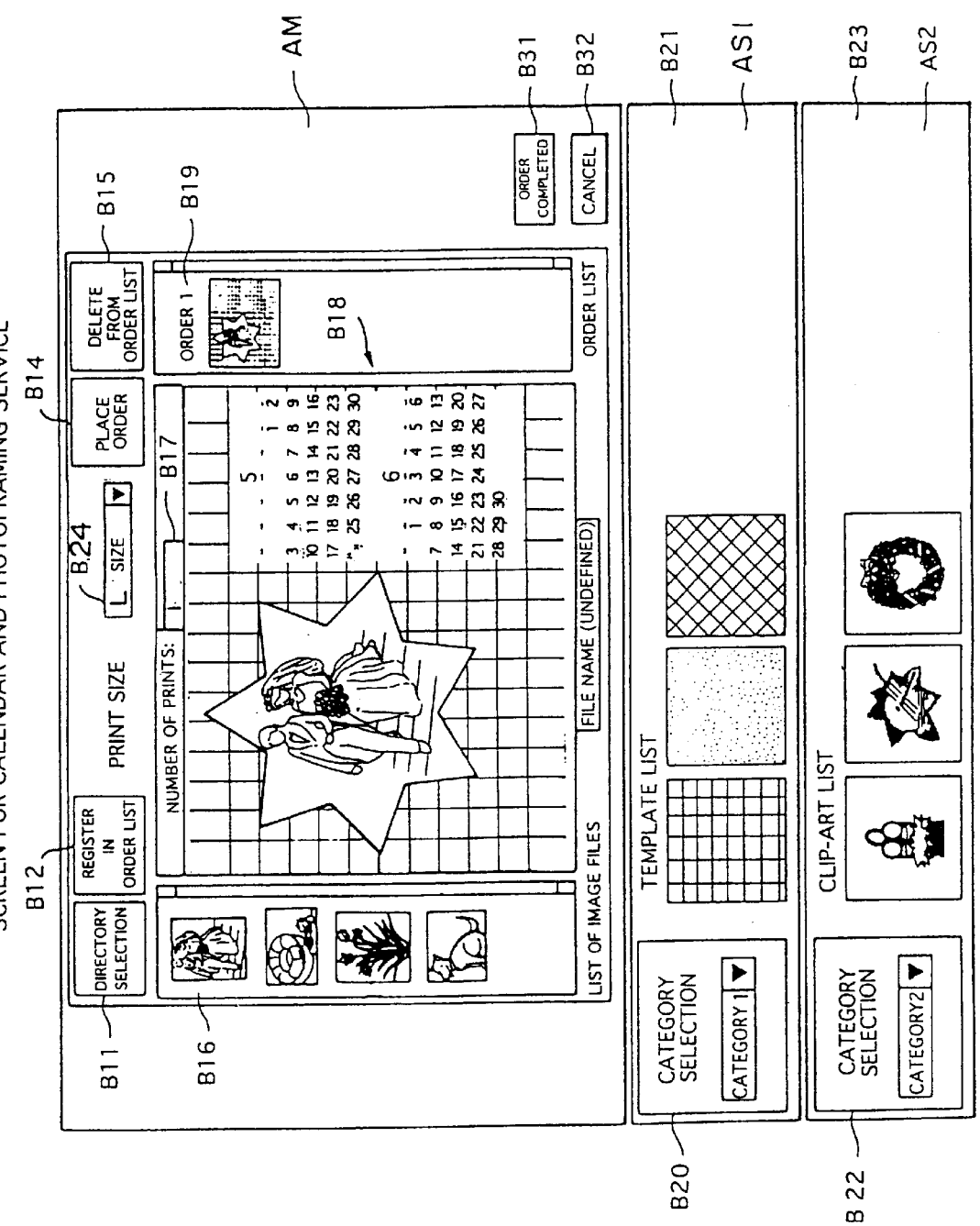
FIG. 34 illustrates the screen of a calendar and photo-framing service.
Figure 35:
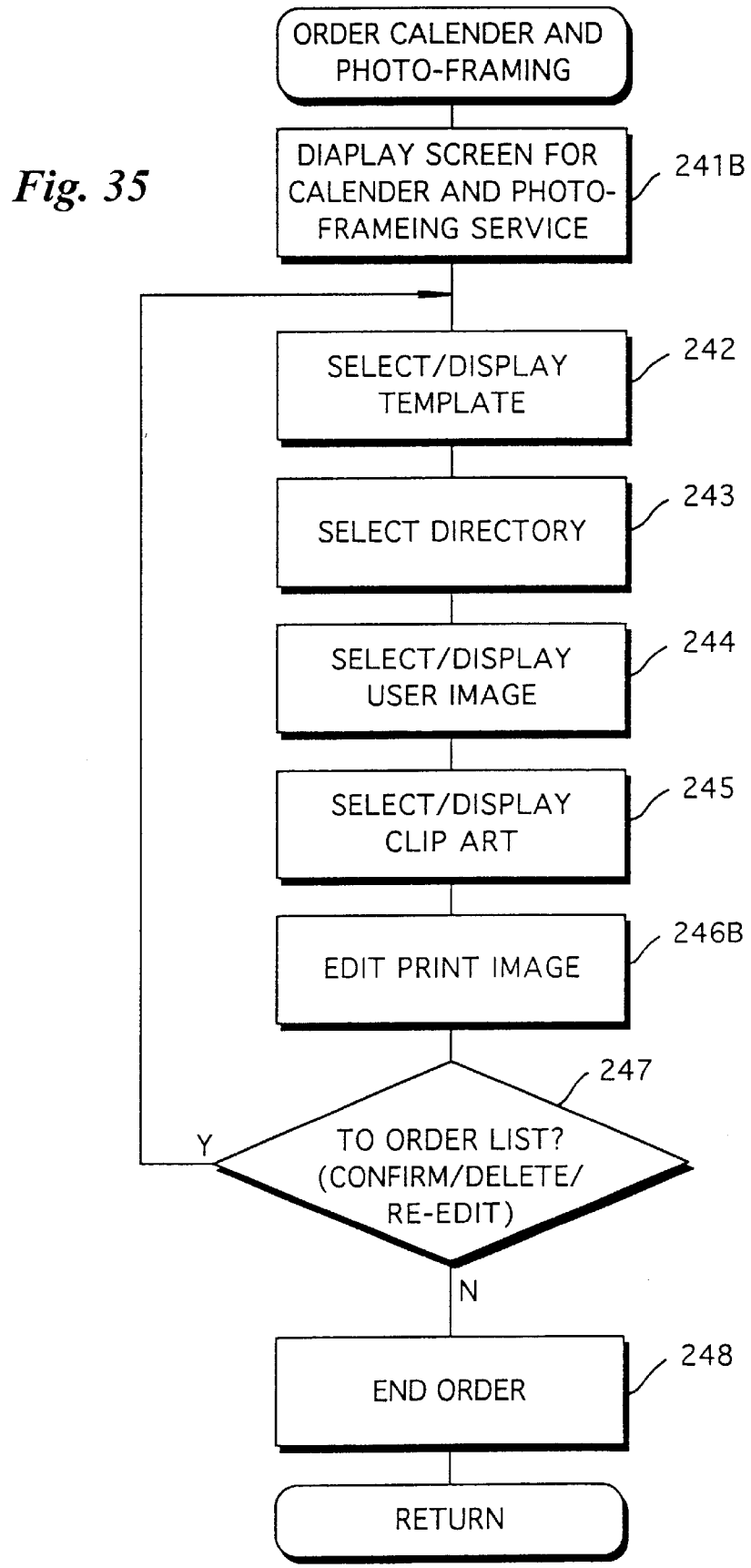
FIG. 35 illustrates processing for ordering a calendar and photo-framing.

FIG. 34 illustrates an example of a calendar and photo-framing service screen. Areas in FIG. 34 having functions identical with those shown in FIG. 30 are designated by like reference characters and are not described again. FIG. 35 is a flowchart showing the processing procedure of the calendar and photo-framing service. Processing steps identical with those of FIG. 31 are designated by like step numbers and are not described again.

When the calendar and photo-framing service is selected on the service menu screen, the calendar and photo-framing service screen shown in FIG. 34 is displayed on the display screen of the display unit 19 of client computer 201 (step 241B).

The calendar and photo-framing service screen has a print-size display area B25. Pulling down the area B25 causes various print sizes to be displayed. The user selects a desired print size from the displayed print sizes.

Editing of a print image is carried out as by selecting a template, selecting a user image or selecting clip art (step 246A). Ordering is completed by clicking on the area B31 (step 248). If a calendar is to be ordered, it goes without saying that the date, etc., is inserted using data representing the date on which the calendar was created.

Figure 39:
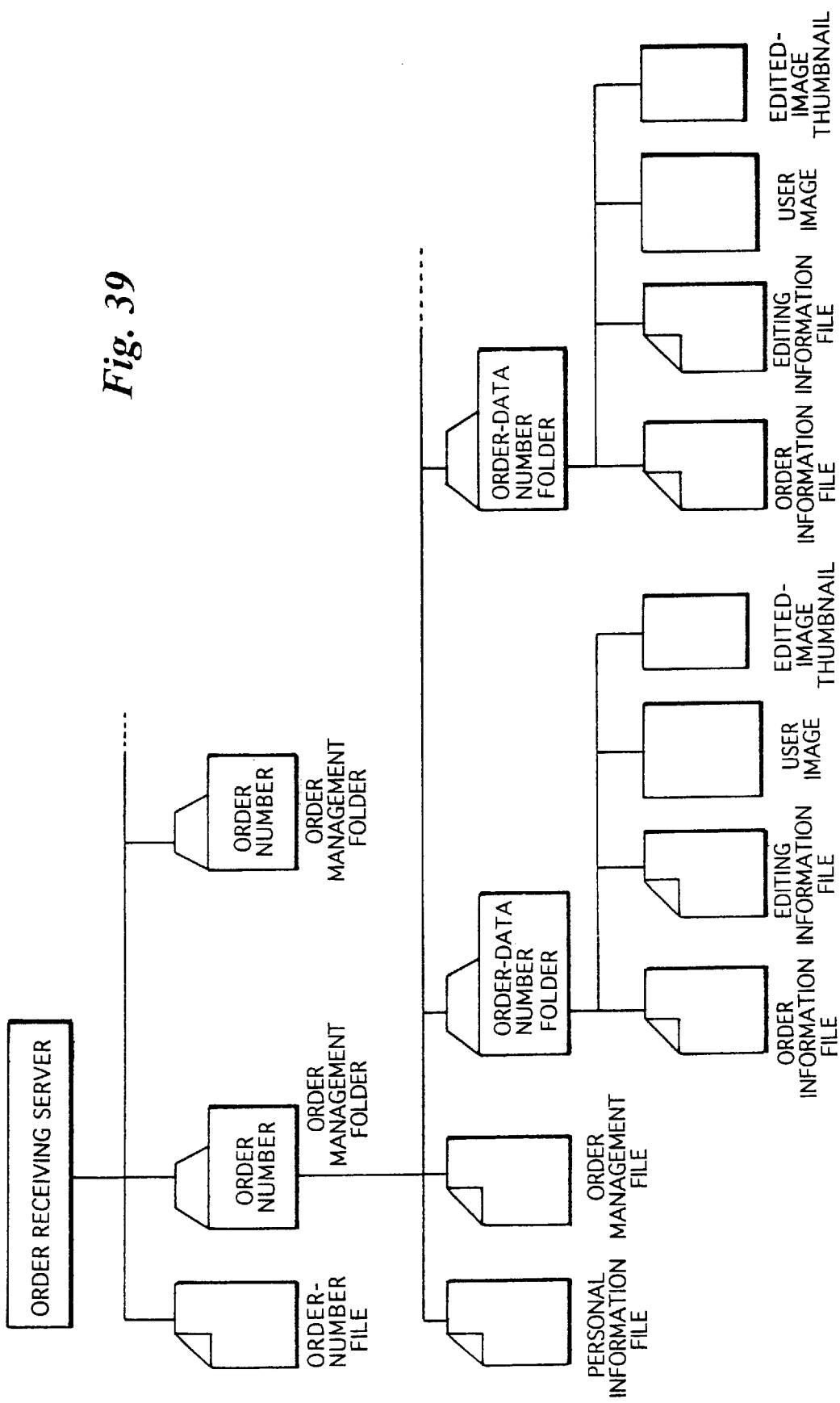
FIG. 39 illustrates the arrangement of folders stored in an image server.

Some of the order information (number of prints and print size) obtained in image editing is stored in an order information file (see FIG. 39).

(3) First Method of Ordering Printed Images

Described first will be processing executed when files, which are necessary for producing a plurality of edited images in a case where the printing of a plurality of edited images is ordered, are transmitted to the image server 230 at once. (This is referred to as batch transmission.)

Figure 36:
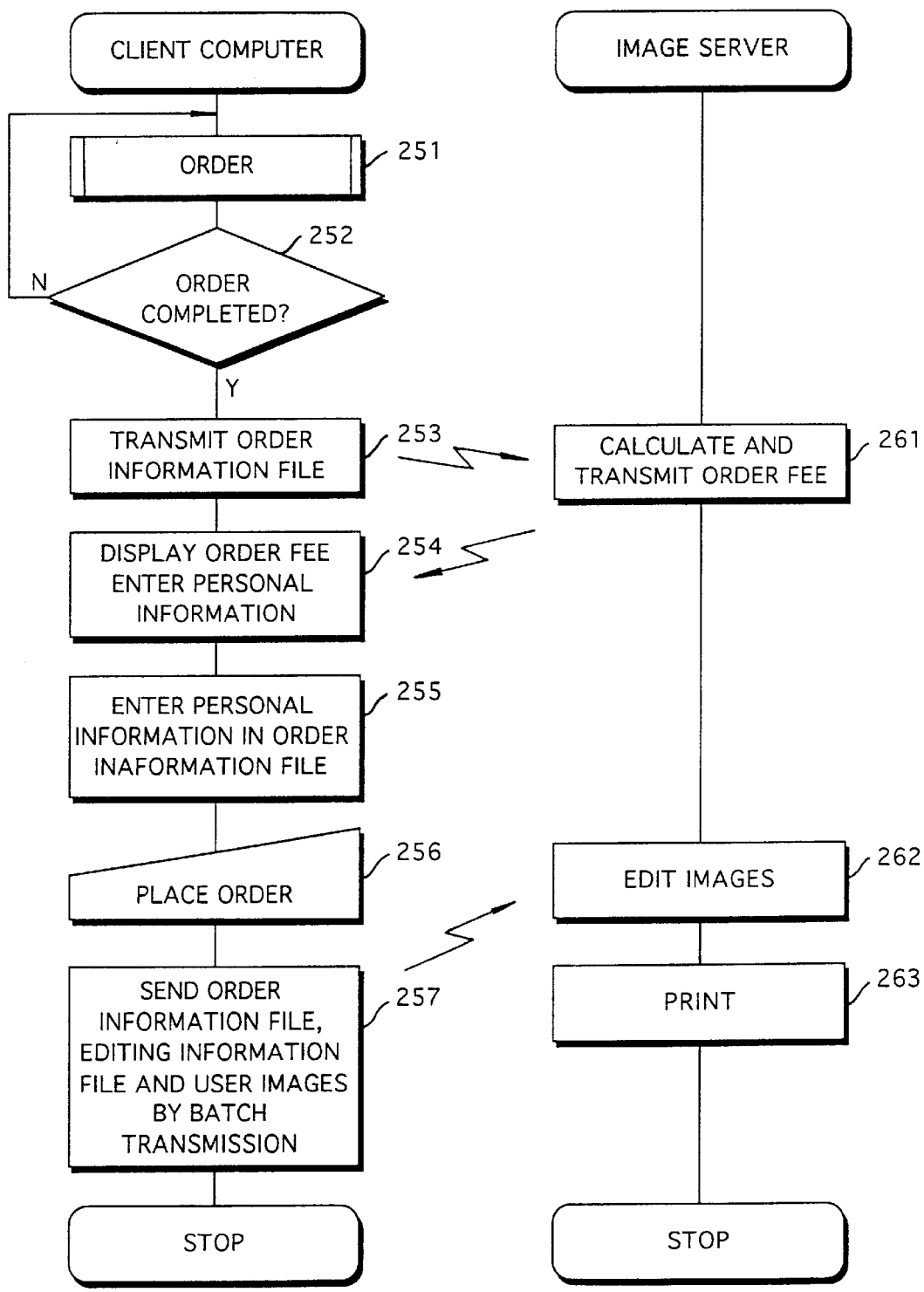
FIG. 36 illustrates a processing procedure for batch transmission.

FIG. 36 is a flowchart showing a processing procedure executed when batch transmission is performed, FIG. 37 illustrates an order information file transmitted from the client computer 201 to the image server 230, and FIG. 38 illustrates an editing information file transmitted from the client computer 201 to the image server 230.

Orders are placed in the various services in the manner described above (step 251). If the order completion area B31 is clicked on to complete the placing or orders (step 252), the order information file shown in FIG. 37 is transmitted from the client computer 201 to the image server 230 (step 253). The number of orders, the e-mail address and the order information have been stored in the order information file. Personal information other than the e-mail address has not been stored in the file. Personal information may be stored in the file beforehand as a matter of course.

When the order information file is received by the image server 230, the order fee is calculated based upon the order information received (step 261). Data representing the calculated order fee is transmitted from the image server 230 to the client computer 201 (step 261).

When the data representing the order fee is received by the client computer 201, the order fee is displayed on the display unit 19 of the client computer 201 (step 254). Next, the user enters personal information, namely his or her name, telephone number facsimile number, postal zip code and address to add this information to the order information file (step 255).

If the ordering area B14 is clicked on by the user (step 256), the order information file shown in FIG. 37, the editing information file shown in FIG. 38 and the user images employed in the image editing are transmitted from the client computer 201 to the image server 230 in one batch (step 257). It goes without saying that an editing information file is created whenever editing is carried out in the order processing described above.

The store server 230 receives the order information file, editing information file and user images transmitted from the client computer 201. Images are edited in accordance with the number of order using the order information file, editing information file and user images (step 262). The edited images are printed by the high-resolution printer of the image server 230 (step 263). The edited images that have been printed would be mailed to the residence of the user of client computer 201 by the operator of image server 230.

Thus, it is possible for orders for a plurality of edited images to be transmitted at one time.

(4) Second Method of Ordering Printed Images

Described next will be processing executed when files, which are necessary for producing a plurality of edited images in a case where the printing of a plurality of edited images is ordered, are transmitted to the image server 230 sequentially whenever an image is edited. (This is referred to as sequential transmission.)

There are instances where a sequential transmission is performed while maintaining the client computer 201 and the image server 230 in the connected state, and instances where a sequential transmission is performed upon breaking the connection between the client computer 201 and image server 230 as necessary.

Of these two types of sequential transmission, sequential transmission in which the connection between the client computer 201 and image server 230 is maintained will be described first.

FIG. 39 illustrates the organization of files and the like in the image server 230, FIG. 40 the constitution of an order-number file generated by the image server 230, FIG. 41 the constitution of an order management file generated by the image server 230, FIG. 42 the constitution of an order information file, and FIG. 43 the constitution of an editing information file.

If an order is accepted from the client computer 201 in sequential transmission, an order number specific to the client computer 201 is issued by the image server 230. The order number that has been issued is managed by the order-number file. In addition to data representing the order number, the following data is stored in the order-number file as information for each order: data representing order status, which indicates whether processing is in progress, processing has been completed or processing has been suspended; data representing the date the order was accepted; data representing the time at which initiation of the order was accepted; data representing the time at which end of the order was accepted; data representing the time at which order processing ended; and data representing the mailing address of the client computer 201.

If an order from the user of the new client computer 201 is accepted, an order management folder is created anew. The order management folder is created for each client computer 201.

When a new order is accepted from the user of the client computer 201, a personal information file, order management file and order-data number folder regarding this user are created. The personal information file, order management file and order-data number folder are stored in the order management folder.

The personal information file is a file in which the personal information regarding the user (the user name, telephone number, facsimile number, postal zip code, address and e-mail address) of the client computer 201 has been stored.

The number of items of order data and the date on which the order data was received are stored in the order management file. Data representing the order-data number and the time at which the order data was accepted is stored in the order management file for every item of order data (order information file, editing information file and user image file).

The order information file, editing information file, user image file and thumbnail image file storing the thumbnail-image data of the edited image have been stored in the order-data number folder.

The order information file, editing information file and user image file (data) are files that have been transmitted from the client computer 201.

Figure 44:
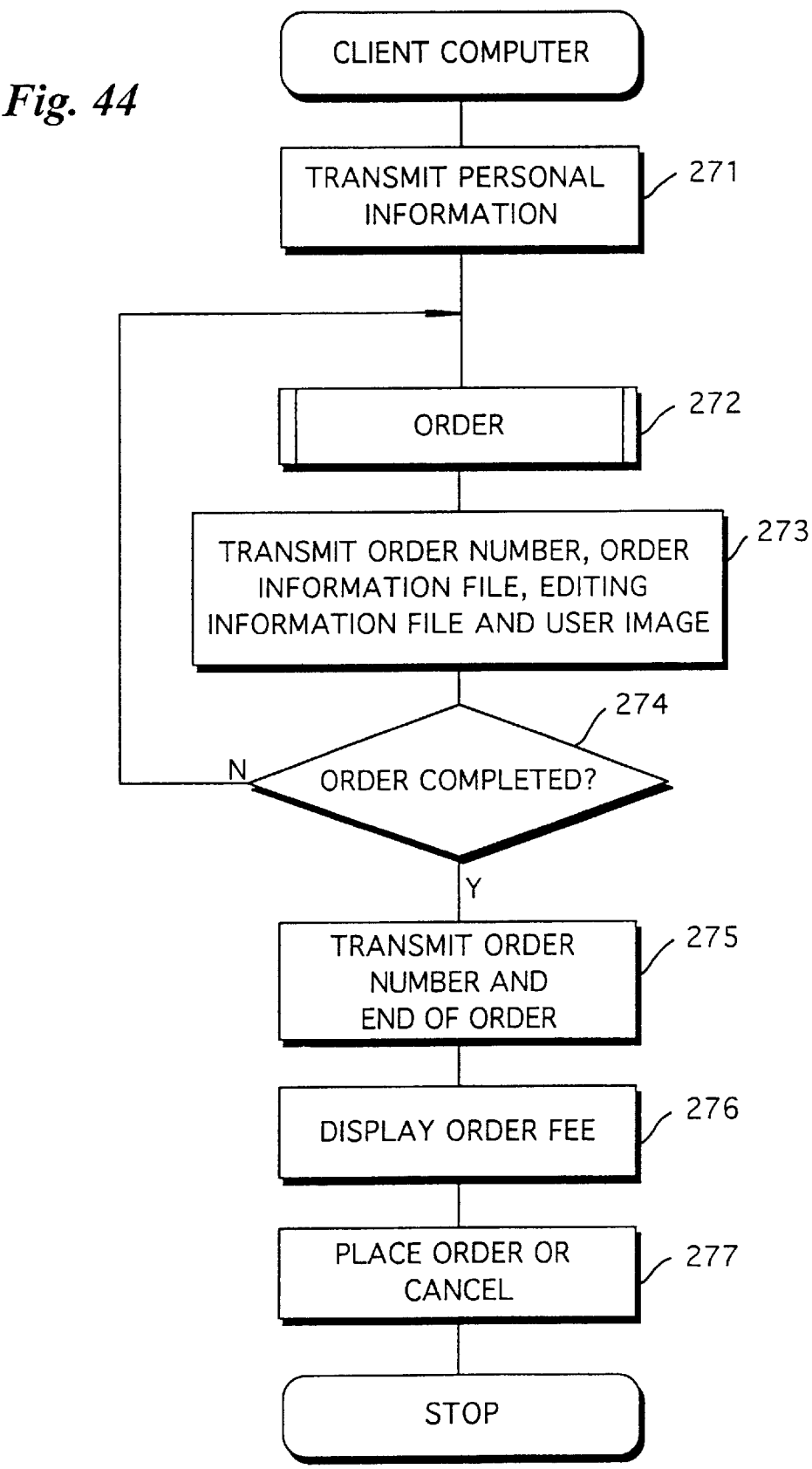
FIGS. 44 to 51 illustrate a processing procedure for sequential transmission.
Figure 45:
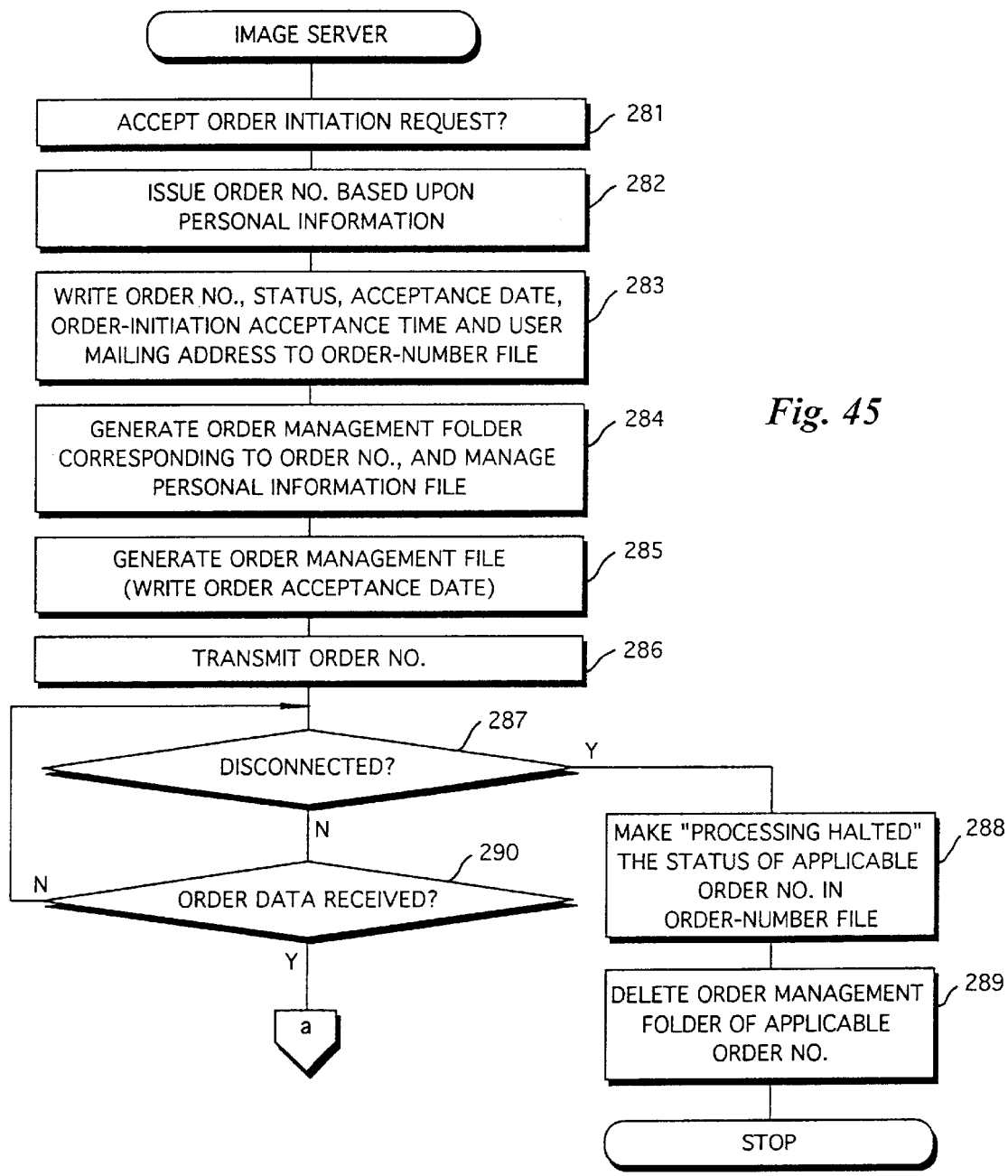

FIG. 44 is a flowchart showing the processing procedure executed by the client computer 201 at the time of sequential transmission, and FIGS. 45 to 48 are flowcharts illustrating the processing procedure executed by the image server 230 at the time of sequential transmission.

In sequential transmission, personal information of the user of client computer 201 is transmitted from the client computer 201 to the image server 230 (step 271). It goes without saying that the personal information is entered by the user of the client computer 201 before a transmission.

When the personal information from the client computer 201 is received by the image server 230, the latter determines whether to accept the request for the initiation of the order (step 281). An order number is issued based upon the personal information received (step 282). If an order number regarding the client computer 201 already exists, an order number is not issued. Data representing the order number (identification data), order status, order acceptance date, the time at which initiation of the order was accepted and the mailing address of the user is stored in the order-number file (step 283).

An order management folder corresponding to the order number is generated and the personal information file is managed (step 284). Next, an order management file is generated and the order acceptance date is written in (step 285). The order number that has been issued is transmitted from the image server 230 to the client computer 201 (step 286).

When the order number is received by the client computer 201, order processing is executed in the manner described above (step 272). An order number, editing information file and user image data which represents user images for composing an edited image are transmitted from the client computer 201 to the image server 230 whenever a single order processing operation is completed (step 273). An order number, editing information file and user image data are transmitted from the client computer 201 to the image server 230 on a per-order basis until the placing of all orders has been completed (steps 272 to 274).

If, prior to disconnection ("NO" at step 287), the order data of an order information file, editing information file and user image file is received from the client computer 201 (step 290), reference is had to the order management folder specified by the order number that has been entered in the order information file contained in the received order data (step 291). A new order-data number specific to each item of order data is issued upon referring to the order-data number that has been recorded in the order management file (step 292).

The number of items of order data recorded in the order management file is incremented, and the newly issued order-data number and order data acceptance time are written in (step 293).

An order-data number folder is generated for each order-data number issued (step 294). The received order information file, editing information file and user image file are generated and stored in the corresponding order-data number folder (step 295). Furthermore, a thumbnail image of the edited image is generated based upon the received order information file, editing information file and user image file. The file representing the generated thumbnail image is stored in the order-data number folder (step 296).

If the order completion area B31 is clicked to end the placement of all orders ("YES" at step 274), then the order number and data indicating the end of the order are transmitted from the client computer 201 to the image server 230 (step 275).

If the image server 230 receives the data indicating the end of an order from the client computer 201, (step 297), reference is had to the personal information file, order management file and order-data number folder applicable to the order number that has been received (step 299). Data representing the time at which the end of the order was accepted is written to the applicable order number information of the order-number file (step 300). The fee regarding all orders is calculated upon referring to the order information stored in all order-data management folders in the order management folder (step 301).

Data representing the calculated fee, thumbnail image of the edited image, order size and number of ordered prints is transmitted from the image server 230 to the client computer 201 (step 302).

On the basis of the data representing the fee transmitted from the image server 230, the client computer 201 displays the fee on the display screen of the display unit 19 of client computer 201 (step 276). The user of the client computer 201 checks the displayed fee and clicks on the ordering area B14 or cancellation area B32. Data representing placement or cancellation of the order is transmitted from the client computer 201 to the image server 230 (step 277).

If data representing placement of an order is transmitted from the client computer 201 to the image server 230 ("YES" at step 303), a counter i is set (step 304).

The image server 230 edits the image in accordance ith the editing information that has been recorded in the editing information file stored in the order-data number folder (step 305). It goes without saying that a user image file that has been transmitted from the client computer 201 is utilized in image editing. The image edited in accordance with the order information that has been recorded in the order information file stored in the order-data number folder is printed by the printer connected to the image server 230 (step 306).

The processing of steps 305, 306 is repeated until the number of items of order data is reached (steps 307, 308).

If the number of items of order data is reached, the number of orders currently being processed stored in the order-number file is decremented (step 309). Next, the time at which order processing ended is written to the order-number information that has been stored in the order-number file (step 310). An indication that processing has ended is transmitted from the image server 230 to the client computer 201 (step 311).

If data indicating cancellation is transmitted from the client computer 201 to the image server 230 ("NO" at step 303), then the number of orders currently being processed stored in the order-number file is decremented (step 312). Further, the order information that has been recorded in the order-number file is placed in a alt condition (step 313). Data indicative of the halting of processing is transmitted from the image server 230 to the client computer 201 (step 314).

The above-described processing is for accepting a plurality of orders in a state in which the image server 230 and client computer 201 are connected to each other. However, an arrangement can be adopted in which the image server 230 and client computer 201 are disconnected, after which orders are accepted from the user of the client computer 201 and the plurality of orders are acknowledged.

Figure 49:
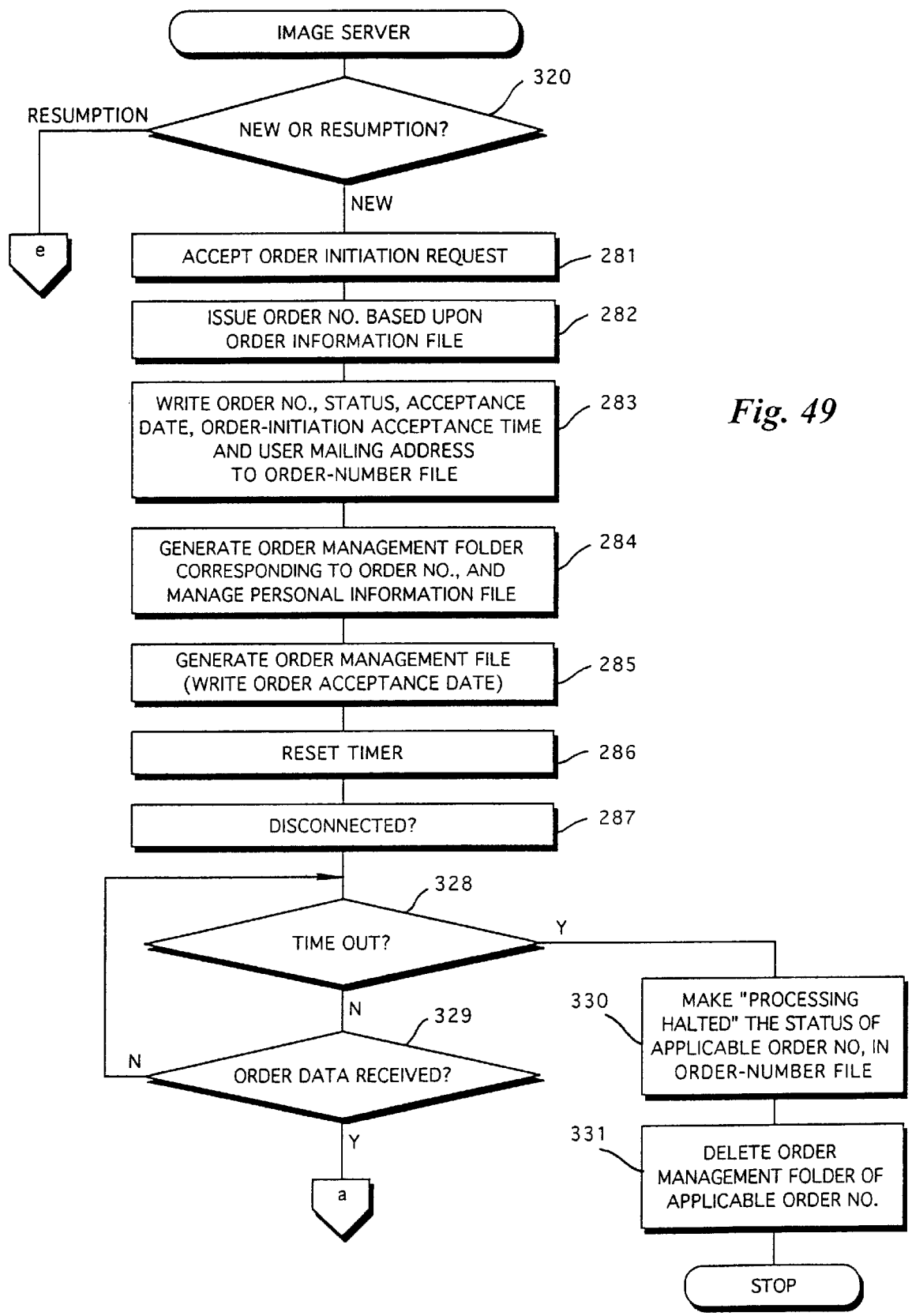
Figure 50:
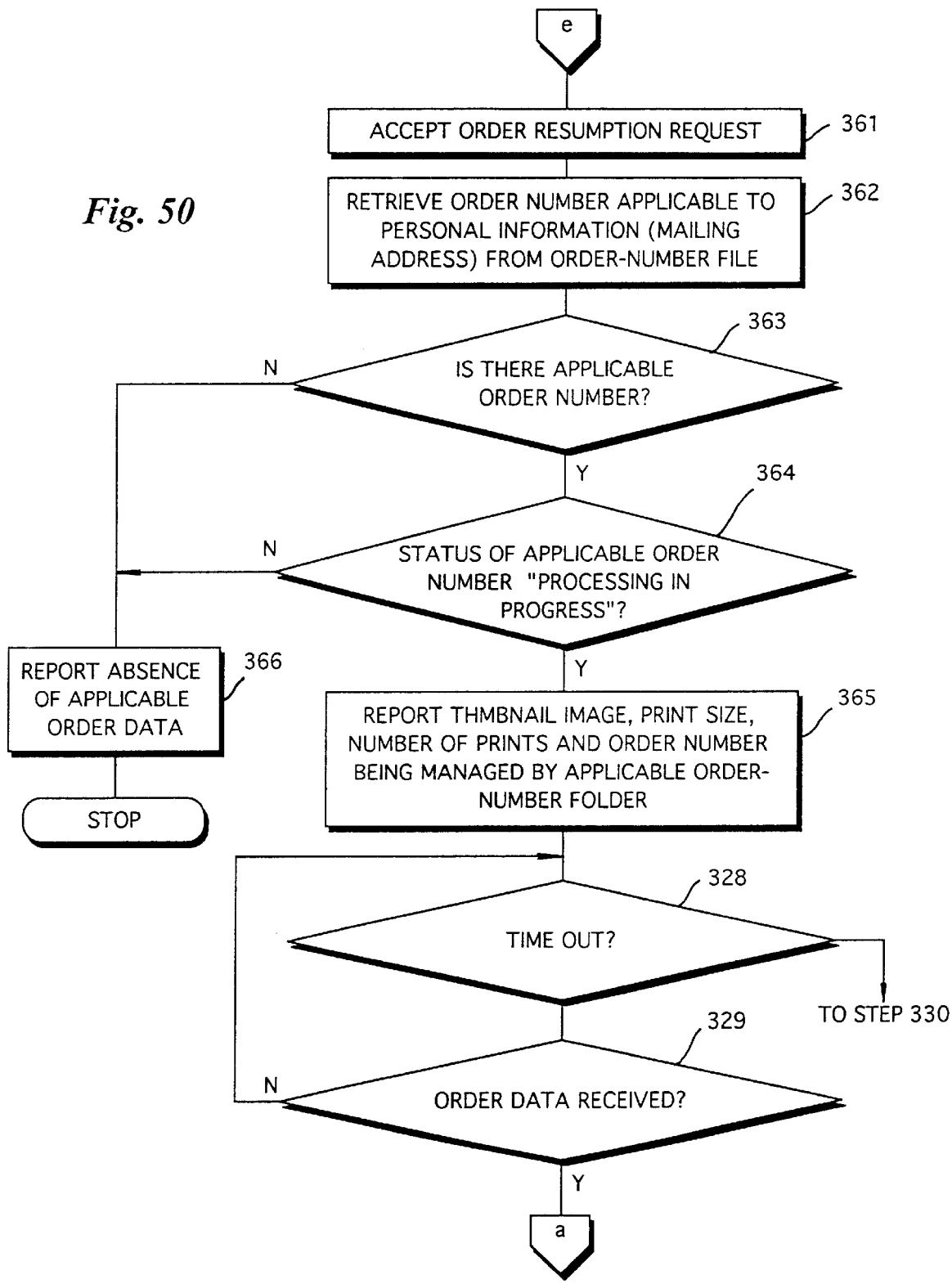
Figure 51:
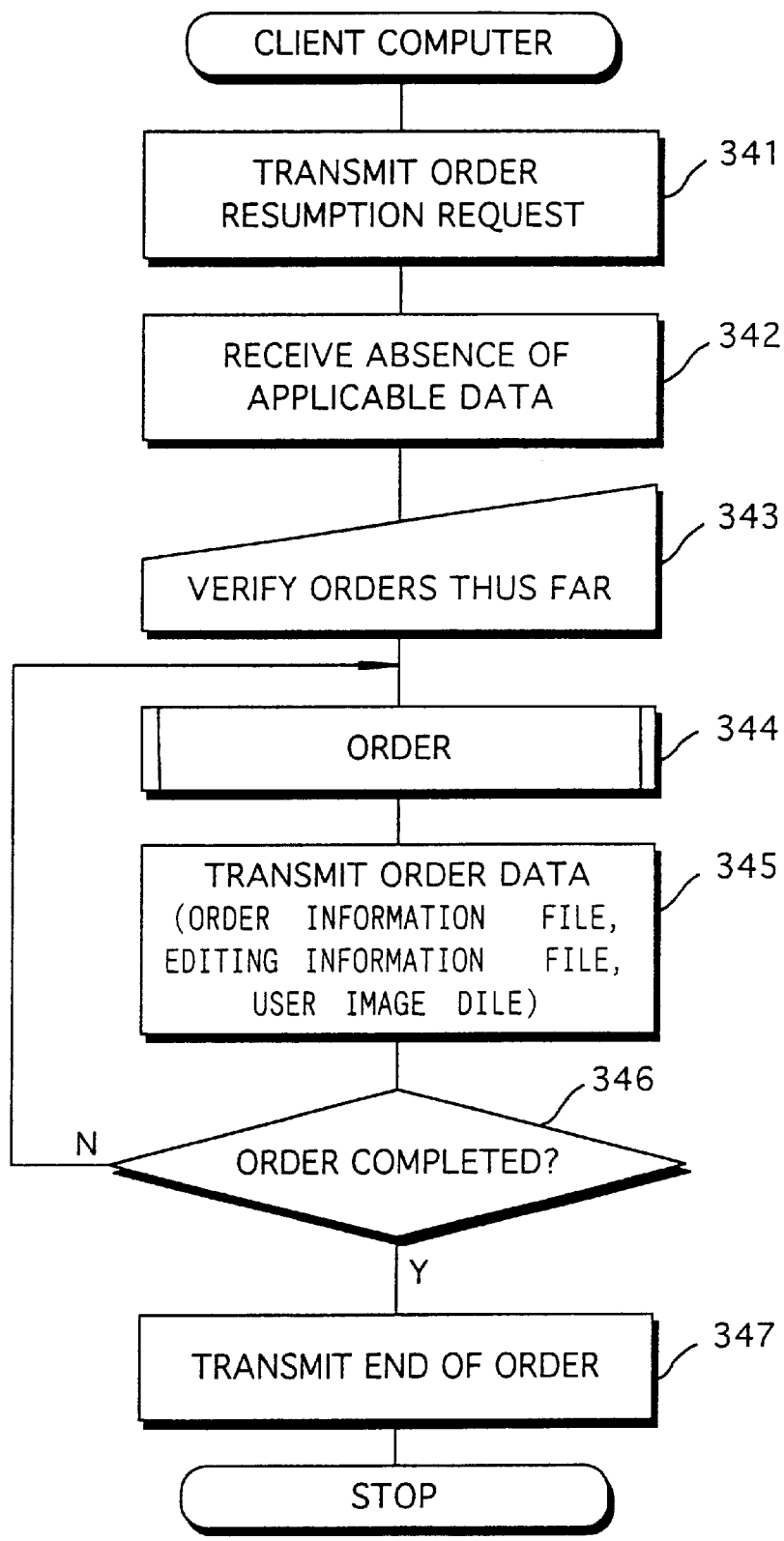

FIGS. 49, 50 and 51 illustrate a processing procedure in a case where a plurality of orders are acknowledged even if the image server 230 and client computer 201 have been disconnected. Processing steps identical with those of FIGS. 44 to 48 are designated by like step numbers and are not described again.

If a request to initiate an order is sent from the client computer 201 to the image server 230, it is determined whether the request to initiate the order is a new request or a request resumed after an order has been placed (step 320).

Figure 47:
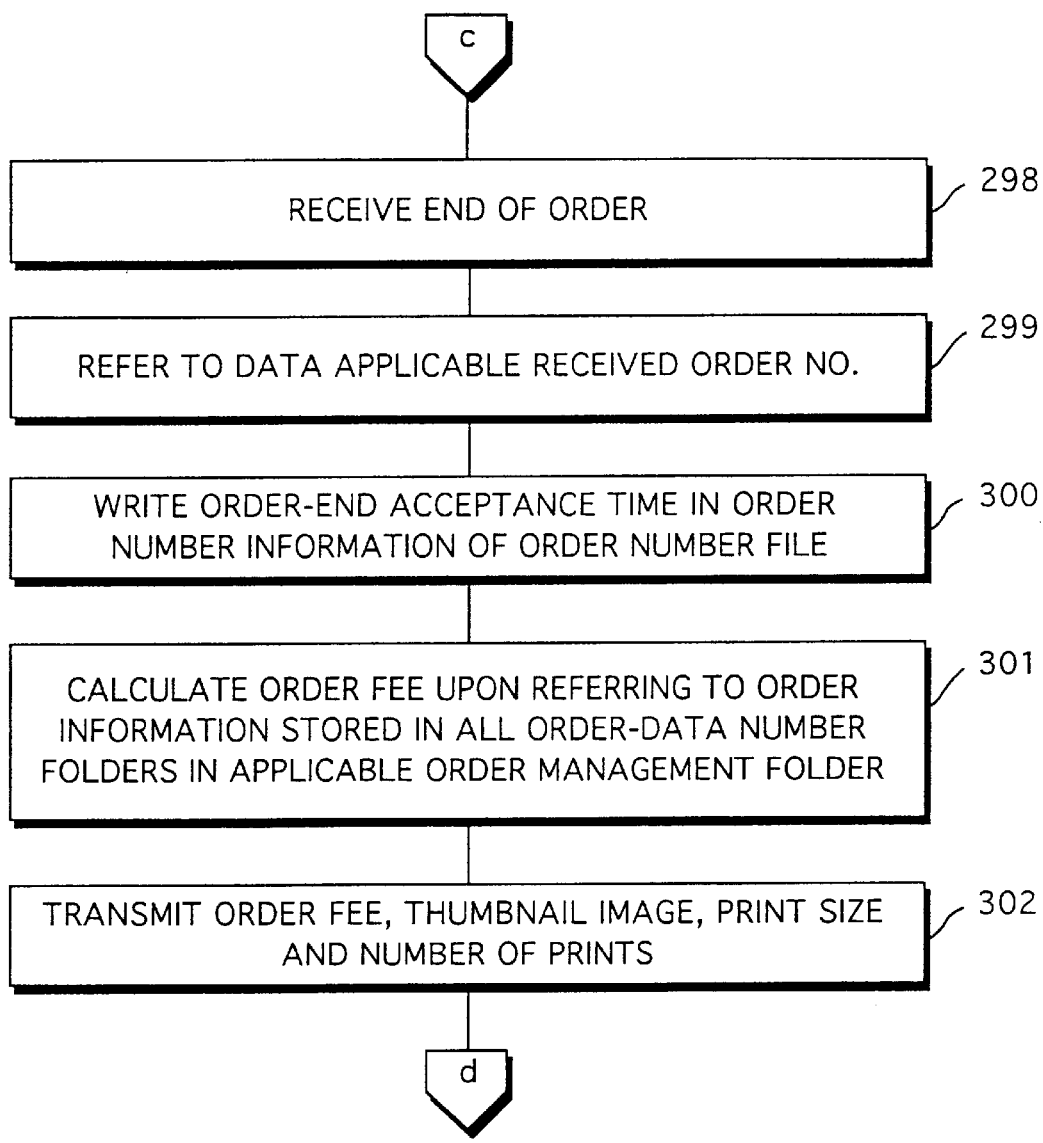
Figure 48:
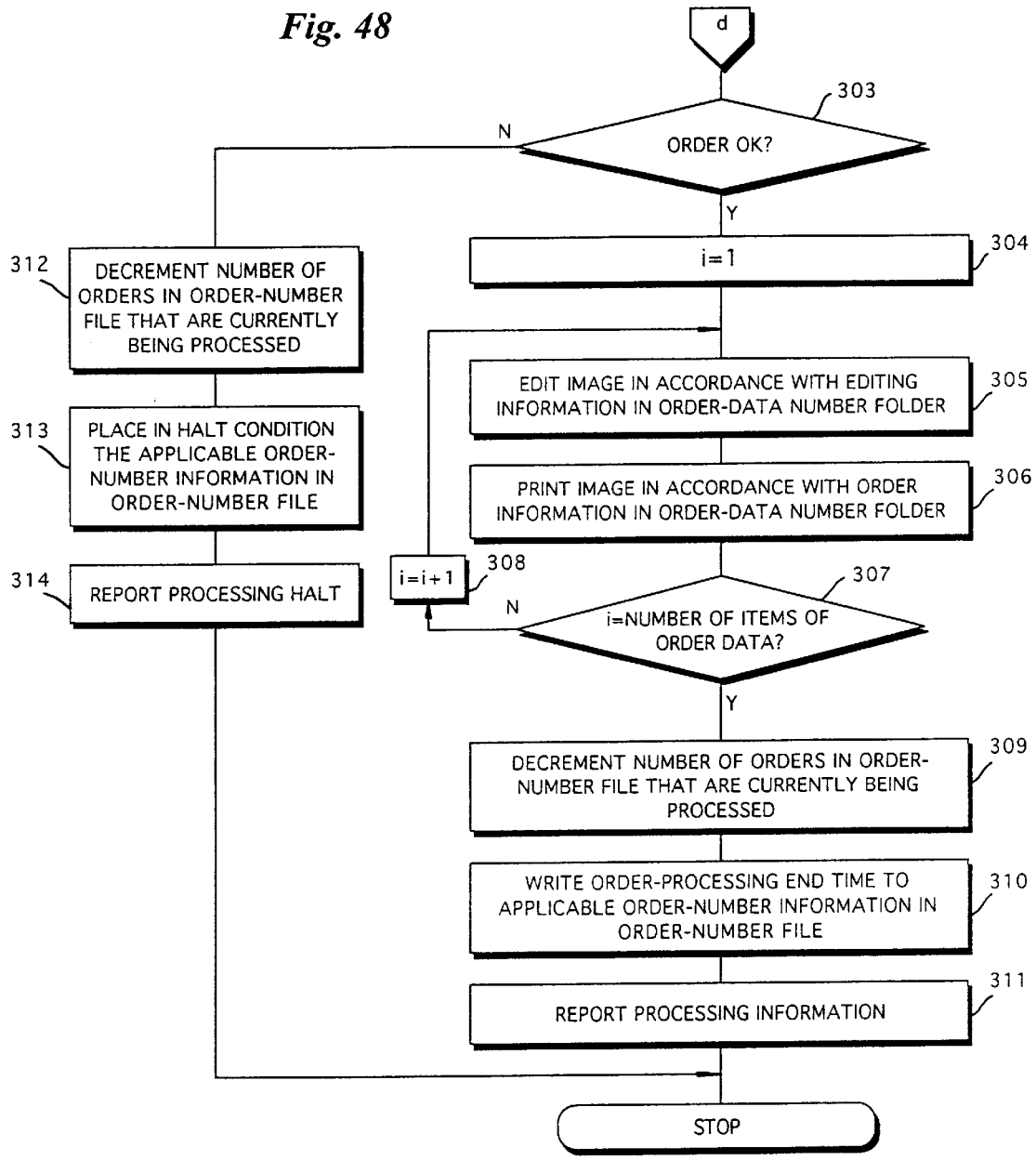

If the request is a new order request, then issuance of an order number, writing of the order number, etc., to the order-number file, generation of an order management folder and generation of an order management file are carried out in a manner similar to the steps illustrated in FIG. 47 (steps 281 to 285).

Next, a timer is reset (step 326). The order number that has been issued is transmitted from the image server 230 to the client computer 201 (step 286).

If the timer measures a fixed period of time and times out before order data is received ("NO" at step 328), then it is considered that the order from the client computer 201 has ended. As a result, the status of the applicable order number in the order-number file is made processing halt (step 330). The order management folder of the applicable order number is then deleted (step 331).

Figure 46:
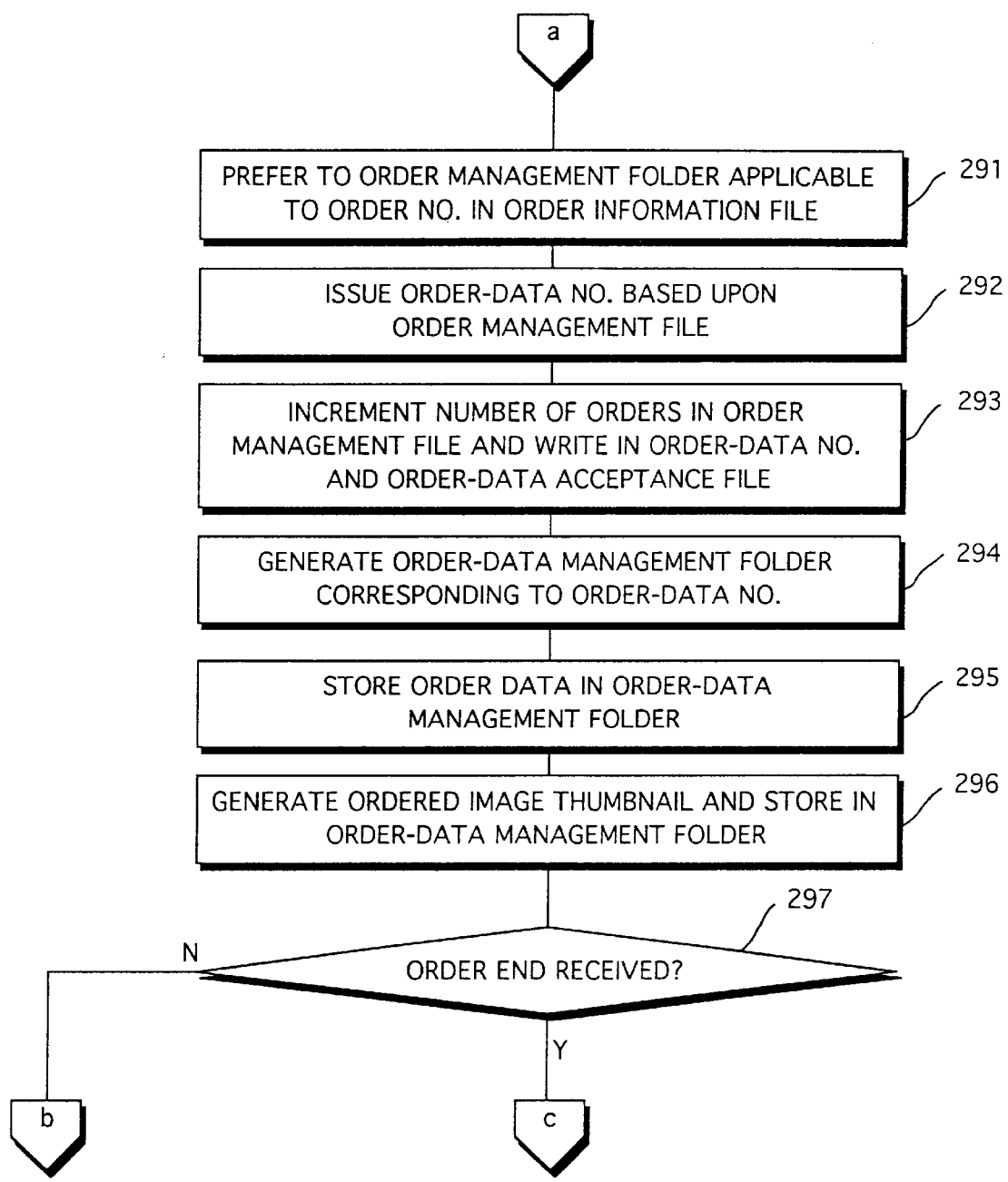

If order data is received from the client computer 201 before time-out ("NO" at step 328, "YES" at step 329), control shifts to the processing from step 291 of FIG. 46 and the edited image is printed.

If an order resumption request is transmitted from the client computer 201 to the image server 230 (steps 341, 320) (personal information concerning the user of the client computer 201 also is transmitted to the image server 230 in an order resumption request), the order number applicable to the personal information (mailing address) is retrieved from the order information file (step 362).

If the applicable order number is found ("YES" at step 363), it is determined whether the status of this order number indicates that the order is currently being processed. If processing is in progress ("YES" at step 364), then the thumbnail image data, number of prints, print size and order number of the edited image being managed by the order-number folder of the applicable order number are transmitted from the image server 230 to the client computer 201 (step 365).

If there is no applicable order number ("NO" at step 363), or the status of the applicable order number indicates that processing is not in progress ("NO" at step 364), then data indicating the absence of applicable order data is transmitted from the image server 230 to the client computer 201 (step 366).

If data representing the absence of applicable order data is received by the image server 230 (step 342), the user of the client computer 201 would initiate a new order.

If order data and data representing an order number are transmitted from the image server 230 to the client computer 201, the image represented by the order data and the order number are displayed on the display unit 19 of the client computer 201. As a result, the user of the client computer 201 verifies the orders thus far (step 343).

If the orders thus far are verified, order processing is carried out by the user of the client computer 201 (step 344).

An order information file, editing information file and user image file are transmitted from the client computer 201 to the image server 230 whenever an order is processed (step 345). If an order information file, editing information file and user image file are transmitted to the image server 230 whenever an order is processed, processing for printing the edited image is executed by the image server 230 (steps 291 to 296 in FIG. 46).

The processing of steps 344 and 345 is repeated by the client computer 201 until all orders end (step 346). When the processing of all orders is finished, data indicative of the end of the orders is transmitted from the client computer 201 to the image server 230 (step 347). As a result, the image server 230 executes the processing of steps 299 to 311 in FIGS. 47 and 48.

The image server 230 is capable of managing order data in regard to each client computer 201 even in a case where order data is transmitted sequentially from the client computer 201 to the image server 230.

As many apparently widely different embodiments of the present invention can be made without departing from the spirit and scope thereof, it is to be understood that the invention is not limited to the specific embodiments thereof except as defined in the appended claims.

What is claimed is:

1. A system for ordering printing of images, in which a store server is installed in each of a plurality of stores, a client computer and an order-taking server are capable of communicating data with each other, and said order-taking server and said store servers are capable of communicating data with each other, wherein said order-taking server comprises:
store-name-list-data transmitting means, which is responsive to a store-name-list request from said client computer, for transmitting data representing a list of store names for ordering printing of an image to said client computer, wherein said client computer includes:
first display control means for controlling a display unit so as to display the list of store names represented by the store-name-list data transmitted from said store-name-list-data transmitting means;
designating means for designating a desired store in the store-name list displayed on said display unit based upon display control by said first display control means;
designated-store-name transmitting means for transmitting, to said order-taking server, data representing the store name designated by said designating means; and
order information transmitting means for transmitting order information, which relates to printing of an image, to said order-taking server, wherein said order-taking server further includes order-related information transmitting means for transmitting information, which is related to the order information transmitted by said order information transmitting means, to said store server installed in the store designated by the data representing the designated store name transmitted from said designated-store-name transmitting means, and wherein said store server includes order-related-information receiving means for receiving the order-related information transmitted from said order-related information transmitting means.

2. The system according to claim 1, wherein said client computer further includes area-specifying data transmitting means for transmitting area-specifying data, which is for specifying and area, to said order-taking server; and said store-name list data transmitting means of said order-taking server transmits, to said client computer, a list of names of stores located in the area represented by the area-specifying data transmitted from said area-specifying data transmitting means.

3. The system according to claim 1, wherein said order-taking server further includes service-data transmitting means for transmitting, to said client computer, image-processing-service data representing services relating to image processing performed by a designated store;

wherein said client computer further includes:
second display control means for controlling the display unit so as to display image processing services represented by the image-processing-service data;
image-processing-service selection means for selecting a desired image processing service from the image processing services displayed on the display unit based upon display control by said second display control means; and
selected-image-processing-service-data transmitting means for transmitting, to said order-taking server, selected-image-processing data representing the image processing service selected by said image-processing-service selection means; and wherein said order-taking server further includes means for executing the image processing service, which is represented by the selected-image-processing data that has been transmitted from said selected-image-processing-service-data transmitting means, in regard to image data representing the image to be printed, and transmitting the image data, which has been subjected to the image processing, to said store server.

4. The system according to claim 1, wherein said order-taking server further includes service-data transmitting means for transmitting, to said client computer, image-processing service data representing services relating to image processing performed by a designated store;

wherein said client computer further includes:
second display control means for controlling the display unit so as to display image processing services represented by the image-processing service data;
image-processing-service selection means for selecting a desired image processing service from the image processing services displayed on the display unit based upon display control by said second display control means; and
selected-image-processing-service-data transmitting means for transmitting, to said order-taking server, selected-image-processing-service data representing the image processing service selected by said image-processing-service selection means; and wherein said order-taking server further includes means for transmitting, to the selected store server, the selected-image-processing-service data transmitted from said selected-image-processing-service-data transmitting means.

5. The system according to claim 1, wherein said client computer further includes:
image-processing-service selection means for selecting a service relating to desired image processing from services relating to a plurality of types of image processing; and
selected-image-processing-service-data transmitting means for transmitting, to said order-taking server, selected image-processing-service data representing the service relaying to the image processing selected by said image-processing-service selection means, wherein said order-taking server further includes image-processing-store-name-list-data transmitting means for transmitting, to said client computer, image-processing-store-name-list data representing a list of names of stores which perform a service relating to the image processing represented by the selected-image-processing-service data transmitted from said selected-image-processing-service-data transmitting means, and wherein said designating means for said client computer designates a desired store from the list of image-processing store names represented by the image-processing-store-name-list data transmitted from said image-processing-store-name-list-data transmitting means.

6. The system according to claim 1, wherein said order-taking server further includes:
user-fee calculating means for calculating a user fee incurred at a designated store in regard to a selected image processing service; and
user-fee transmitting means for transmitting the user fee calculated by said user-fee calculating means to said client computer.

7. The system according to claim 1, wherein said order-taking server further includes advertising-data transmitting means which, in response to receipt of data representing a designated store, transmits data representing an advertisement regarding this designated store to said client computer.

8. A client computer constructing a system in which a store server is installed in each of a plurality of stores, the client computer and an order-taking server are capable of communication data with each other, and said order-taking server and said store servers are capable of communicating data with each other, said client computer comprising:
store-name-list-data receiving means for receiving data representing a list of store names for ordering printing of an image transmitted from said order-taking server;
first display control means for controlling a display unit so as to display the list of store names represented by the store-name-list data received by said store-name-list-data receiving means;
designating means for designating a desired store in the store-name list displayed on said display unit based upon display control by said first display control means;
designated-store-name transmitting means for transmitting, to said order-taking server, data representing the store name designated by said designating means; and
order information transmitting means for transmitting order information, which relates to printing of an image, to said order-taking server.

9. An order-taking server constructing a system in which a store server is installed in each of a plurality of stores, a client computer and the order-taking server are capable of communicating data with each other, and said order-taking server and said store servers are capable of communicating data with each other, said order-taking server comprising:
store-name-list-data transmitting means, which is responsive to a store-name-list request, for transmitting data representing a list of store names for ordering printing of an image to said client computer;
receiving means for receiving data representing a store name designated in said client computer and order information relating to printing of an image; and order-related information transmitting means for transmitting information, which is related to the order information transmitted by said order information transmitting means, to said store server installed in the store designated by the data representing the designated store name received by said receiving means.

10. An order-taking server constructing a system in which a client computer and the order-taking server are capable of communicating data with each other, said order-taking server comprising:

store-name-list-data transmitting means, which is responsive to a store-name-list request, for transmitting data representing a list of store names for ordering printing of an image to said client computer;

receiving means for receiving data representing a store name designated in said client computer and order information relating to printing of an image; and printing means for printing an image based upon the order information received by said receiving means.

11. A method of ordering printing of images in a system in which a store server is installed in each of a plurality of stores, a client computer and an order-taking server are capable of communicating data with each other, and said order-taking server and said store servers are capable of communicating data with each other, said method comprising:

transmitting data representing a store-name list including a list of store names for ordering printing of an image from the order-taking server to the client computer in response to a request for the store-name list from the client computer;

displaying, on a display unit of the client computer, the store-name list represented by the store-name-list data transmitted from the order-taking server;

designating a desired store in the store-name list displayed on the display unit;

transmitting, from the client computer to the order-taking server, data representing the designated store name and order information relating to printing of an image;

transmitting information, which is related to the order information transmitted at the order information transmitting step, from the order-taking server to the store server installed in the store designated by the data representing the designed store name transmitted from the client computer; and receiving the order-related information, which is transmitted from the order-taking server, at the store server.

12. The method according to claim 11, further comprising:

transmitting area-specifying data, which is for specifying an area, from said client computer to said order-taking server; and transmitting, from said order-taking server to said client computer, a list of names of stores located in the area represented by the area-specifying data transmitted from said client computer.

13. The method according to claim 11, further comprising:

transmitting, from said order-taking server to said client computer, image-processing-service data representing services relating to image processing performed by a designated store;

displaying image processing services represented by the image-processing-service data on a display unit of said client computer;

selecting a desired image processing service from the image processing services displayed on the display unit;

transmitting, from said client computer to said order-taking server, selected-image-processing-service data representing the image processing service that has been selected; and in said order-taking server, executing the selected image processing services, which is represented by the selected-image-processing data that has been transmitted, in regard to image data representing the image to be printed, and transmitting the image data, which has been subjected to the image processing, to said store server.

14. The method according to claim 11, further comprising:

transmitting, from said order-taking server to said client computer, image-processing-service data representing services relating to image processing performed by a designated store;

displaying image processing services represented by the image-processing-service data on a display unit of said client computer;

selecting a desired image processing service from the image processing services displayed on the display unit of said client computer;

transmitting, from said client computer to said order-taking server, selected-image-processing-service data representing the image processing service that has been selected; and transmitting, from said order-taking server to the selected store server, the selected-image-processing-service data that has been transmitted.

15. The method according to claim 11, further comprising in said client computer:

selecting a desired image processing service from a plurality of image processing services;

transmitting, to said order-taking server, selected-image-processing-service data representing the image processing service that has been selected; and selecting in said order-taking server a desired store form the list of image-processing store names represented by the image-processing-store-name-list data.

16. A method of controlling operation of a client computer constructing a system in which a store server is installed in each of a plurality of stores, the client computer and an order-taking servers are capable of communicating data with each other, and said order-taking server and said store servers are capable of communicating data with each other, comprising:

receiving data representing a list of store names for ordering printing of an image transmitted from said order-taking server;

displaying the list of store names represented by the store-name-list data that has been received;

designating a desired store in the store-name list that has been displayed;

transmitting, to said order-taking server, data representing the store name that has been designated; and transmitting order information, which related to printing of an image, to said order-taking server.

17. A method of controlling an order-taking server constructing a system in which a store server is installed in each of a plurality of stores, a client computer and the order-taking server are capable of communicating data with each other, and said order-taking server and said store servers are capable of communicating data with each other, comprising:

transmitting data representing a list of store names for ordering printing of an image to said client computer in response to a store-name-list request;

receiving data representing a designated store name and order information relating to printing of an image; and transmitting information, which is related to the order information, to said store server installed in the store designated by the data representing the designated store name that has been received.

18. A method of controlling operation of an order-taking server constructing a system in which a client computer and the order-taking server are capable of communicating data with each other, comprising:

transmitting data representing a list of store names for ordering printing of an image to said client computer in response to a store-name-list request;

receiving data representing a designated store name and order information relating to printing of an image; and printing an image based upon the order information that has been received.

19. A recording medium storing a program for controlling operation of a client computer constructing a system in which a store sever is installed in each of a plurality of stores, the client computer and an order-taking server are capable of communicating data with each other, and said order-taking server and said store servers are capable of communicating data with each other, so as to:

receive data representing a list of store names including a list of store names for ordering printing of an image transmitted from said order-taking server;

display the list of store names represented by the store-name-list data that has been received;

designate a desired store in the store-name list that has been displayed;

transmit, to said order-taking server, data representing the store name that has been designated; and transmit order information, which relates to printing of an image, to said order-taking server.

20. The system according to claim 1, wherein, when said client computer and said order-taking server are first connected, said first display control means controls said display unit to display a personal information recording area, a service menu area, and a store list area.

21. The system according to claim 20, wherein selection by said user of said store list area generates said store-name-list request from said client computer.

22. The system according to claim 20, wherein selection by said user of one of said service menu area and said store list area generates said store-name-list request from said client computer.

23. The system according to claim 1, wherein said order-taking server transmits said data representing a list of store names to said client computer prior to a display by said display unit of a user fee.

24. The system according to claim 1, wherein said designated-store-name transmitting means transmits the data representing the store name designated to said order-taking server prior to a transmittal of the order information by said order information transmitting means to said order taking server.

25. The system according to claim 2, wherein said area-specifying data comprises one of prefecture, postal zip code, city/town, and user address.

26. The system according to claim 25, wherein said area-specifying data comprises personal-information data input to a personal information recording area of said client computer.

27. A system for ordering printed images entries, comprising:

at least one store server located in at least one store for printing images;

an order-taking server communicatively connected with said at least one store server, said order-taking server for taking an order from a client and for calculating a fee based on said order; and a client computer communicatively connected with said order-taking server, said client computer including display control means for controlling a display to display a list of store names for ordering printing of an image, wherein said order-taking server, based upon a store-name-list request from said client computer, transmits data representing said list of store names for ordering printing of an image to said client computer, and wherein said order-taking server calculates said fee based on said order after the client selects a store from said displayed list of store names.

28. The system according to claim 27, wherein said client computer further includes:

designating means for designating a desired store in the store-name list displayed on said display unit based upon display control by said display control means;

designated-store-name transmitting means for transmitting, to said order-taking server, data representing the store name designated by said designating means; and order information transmitting means for transmitting order information, which relates to printing of an image, to said order-taking server.

29. The system according to claim 28, wherein said order-taking server further includes order-related information transmitting means for transmitting information, which is related to the order information transmitted by said order information transmitting means, to said at least one store server installed in the store designated by the data representing the designated store name transmitted from said designated-store-name transmitting means, and wherein said at least one store server includes order-related-information receiving means for receiving the order-related information transmitted from said order-related information transmitting means.

30. The system according to claim 1, wherein said order-taking server transmits said data representing a list of store names to said client computer prior to a transmittal of order information by said order information transmitting means to said order-taking server.

31. The client computer according to claim 8, wherein said order-taking server transmits said data representing a list of store names to said client computer prior to a transmittal of order information by said order information transmitting means to said order-taking server.

32. The order-taking server according to claim 9, wherein said order-taking server transmits said data representing a list of store names to said client computer prior to a transmittal of order information by said order information transmitting means to said order-taking server.

33. The order-taking server according to claim 10, wherein said order-taking server transmits said data representing a list of store names to said client computer prior to a transmittal of order information by said order information transmitting means to said order-taking server.

34. The method according to claim 11, wherein said order-taking server transmits said data representing a list of store names to said client computer prior to a transmittal of order information by said order information transmitting means to said order-taking server.

35. The method according to claim 16, wherein said order-taking server transmits said data representing a list of store names to said client computer prior to a transmittal of order information by said order information transmitting means to said order-taking server.

36. The method according to claim 17, wherein said order-taking server transmits said data representing a list of store names to said client computer prior to a transmittal of order information by said order information transmitting means to said order-taking server.

37. The method according to claim 18, wherein said order-taking server transmits said data representing a list of store names to said client computer prior to a transmittal of order information by said order information transmitting means to said order-taking server.

38. The recording medium according to claim 19, wherein said order-taking server transmits said data representing a list of store names to said client computer prior to a transmittal of order information by said order information transmitting means to said order-taking server.

39. The system of claim 1, wherein the order information includes image data representing the image to be printed, and the store server causes the image to be based on the image data transmitted to the store server.

40. The client computer of claim 8, wherein the order information includes image data representing the image to be printed, and the store server causes the image to be based on the image data transmitted to the store server.

41. The order-taking server of claim 9, wherein the order information includes image data representing the image to be printed, and the store server causes the image to be based on the image data transmitted to the store server.

42. The order-taking server of claim 10, wherein the order information includes image data representing the image to be printed, and the store server causes the image to be based on the image data transmitted to the store server.

43. The method of claim 11, wherein the order information includes image data representing the image to be printed, and the store server causes the image to be based on the image data transmitted to the store server.

44. The method of claim 16, wherein the order information includes image data representing the image to be printed, and the store server causes the image to be based on the image data transmitted to the store server.

45. The method of claim 17, wherein the order information includes image data representing the image to be printed, and the store server causes the image to be based on the image data transmitted to the store server.

46. The method of claim 18, wherein the order information includes image data representing the image to be printed, and the store server causes the image to be based on the image data transmitted to the store server.

47. The recording medium of claim 19, wherein the order information includes image data representing the image to be printed, and the store server causes the image to be based on the image data transmitted to the store server.

48. The system of claim 27, wherein the order information includes image data representing the image to be printed, and the store server causes the image to be based on the image data transmitted to the store server.

49. The system according to claim 27, wherein said display unit displays a top page screen comprising a personal information recording area, a service menu area, and a store list area.

50. The system according to claim 49, wherein said service menu area is selected to display a service menu display screen comprising an area representing a content of services capable of being utilized in said system.

51. The system according to claim 49, wherein said store list area is selected to display a store list display screen comprising a store display area including said list of store names, an area for indicating a method of narrowing down stores, and a pull-down area for changing said method of narrowing down stores.

52. The system according to claim 27, wherein said list of store names are displayed on a display screen along with an area indicating a method of narrowing down stores in said list.

53. The system according to claim 1, wherein upon said client computer first communicating with said order taking server, said display unit displays a store list area for requesting said list of store names for ordering printing of an image.

54. The system according to claim 53, wherein said store list area is included on a top page of said order-taking server.

55. The system according to claim 53, wherein selecting a store from said store list causes order information for printing an image to be transmitted to said order-taking server which transmits said order information to a store server corresponding to a store which was selected.

56. The system according to claim 55, wherein said order information comprises image data representing an image to be printed.

* * * * *